(12) United States Patent  
Chandler et al.

(10) Patent No.: US 10,036,664 B2
(45) Date of Patent: Jul. 31, 2018

(54) METHOD AND APPARATUS FOR SORTING AND COMBINING FRAGILE AND VARYING DENSITY PIECES

(71) Applicant: BOT LLC, Seattle, WA (US)

(72) Inventors: Steven T. Chandler, Seattle, WA (US); William Tennant, Sammamish, WA (US)

(73) Assignee: BOT LLC, Seattle, WA (US)

(*) Notice: Subject to any disclaimer, the term of this patent is extended or adjusted under 35 U.S.C. 154(b) by 187 days.

(21) Appl. No.: 15/089,417

(22) Filed: Apr. 1, 2016

(65) Prior Publication Data
US 2016/0290852 A1  Oct. 6, 2016

Related U.S. Application Data

(60) Provisional application No. 62/142,480, filed on Apr. 3, 2015.

(51) Int. Cl.
*G01G 19/393* (2006.01)
*G01G 19/52* (2006.01)

(52) U.S. Cl.
CPC ........... *G01G 19/52* (2013.01); *G01G 19/393* (2013.01)

(58) Field of Classification Search
CPC ..... G01G 19/52; G01G 19/387; G01G 19/393
See application file for complete search history.

(56) References Cited

U.S. PATENT DOCUMENTS

| 4,267,894 | A | | 5/1981 | Hirano et al. | |
| 4,388,975 | A | | 6/1983 | Hirano | |
| 4,428,179 | A | * | 1/1984 | Jordan | G01G 19/393 177/23 |
| 4,442,910 | A | * | 4/1984 | Mikami | G01G 19/393 177/145 |
| 4,444,282 | A | | 4/1984 | Kawanishi | |
| 4,605,082 | A | | 8/1986 | Matsuura | |
| 4,610,323 | A | | 9/1986 | Chenoweth et al. | |
| 4,708,215 | A | | 11/1987 | Nakamura et al. | |
| 4,720,961 | A | * | 1/1988 | Jordan | G01G 19/393 177/1 |
| 4,753,306 | A | | 6/1988 | Mosher | |
| 4,782,454 | A | | 11/1988 | Nakamura | |
| 4,821,820 | A | * | 4/1989 | Edwards | G01G 19/393 177/1 |

(Continued)

FOREIGN PATENT DOCUMENTS

| CA | 1213620 | 11/1986 |
| CA | 1261362 | 9/1989 |

(Continued)

*Primary Examiner* — Randy Gibson
(74) *Attorney, Agent, or Firm* — DLA Piper (US)

(57) ABSTRACT

The system and method combine a large population of varying density pieces into sets that meet a specified target weight range. This is accomplished by creating a sample size of a pre-weighed payload of varying density pieces ("pieces") for an automated system to determine optimal combinations sets based on piece weight data. The system combines pieces into the sets within a fixed weight tolerance. Significant hurdles overcome with this approach include avoiding damage to the fragile pieces, accurate measuring very low weights. All of this is achieved at extremely high speed and precision.

14 Claims, 22 Drawing Sheets

(56) References Cited

U.S. PATENT DOCUMENTS

| | | | | |
|---|---|---|---|---|
| 4,838,368 | A | * | 6/1989 | Sato .................... G01G 19/393 177/238 |
| 4,972,882 | A | | 11/1990 | Kohashi |
| 5,040,625 | A | * | 8/1991 | Yamanaka ........... G01G 19/393 177/25.18 |
| 5,191,947 | A | | 3/1993 | Petersen |
| 5,321,212 | A | * | 6/1994 | Wadell ................ G01G 19/393 177/147 |
| 5,753,792 | A | | 5/1998 | Olson |
| 5,760,342 | A | | 6/1998 | Takeda et al. |
| 5,889,235 | A | * | 3/1999 | Kawanishi ........... G01G 19/387 177/25.18 |
| 6,122,895 | A | * | 9/2000 | Schubert .................. B65B 5/12 53/240 |
| 6,268,571 | B1 | | 7/2001 | Benyukhis |
| 6,271,486 | B1 | | 8/2001 | Franklin et al. |
| 6,285,918 | B1 | * | 9/2001 | Kono .................. G01G 19/393 53/502 |
| 6,374,984 | B1 | * | 4/2002 | Nagler .................... B07C 5/361 177/1 |
| 6,705,827 | B2 | | 3/2004 | Keller et al. |
| 6,881,907 | B2 | * | 4/2005 | Winkelmolen ...... B65G 47/766 177/145 |
| 6,978,882 | B2 | * | 12/2005 | Nagler .................... B25J 9/0093 198/468.2 |
| 7,004,331 | B2 | * | 2/2006 | Tew .......................... B07C 5/18 209/592 |
| 7,258,237 | B2 | * | 8/2007 | Nielsen .................... B07C 5/16 177/145 |
| 7,279,644 | B1 | * | 10/2007 | Kasel ..................... G01G 11/00 177/125 |
| 7,775,373 | B2 | * | 8/2010 | Grundtvig ............... B65B 5/105 177/145 |
| 8,222,543 | B2 | * | 7/2012 | Grundtvig ............... B65B 5/105 177/145 |
| 8,753,696 | B1 | | 6/2014 | Lewis |
| 8,910,630 | B2 | | 12/2014 | Todd |
| 9,217,661 | B2 | | 12/2015 | Clark |
| 9,228,884 | B2 | * | 1/2016 | Kawanishi ........... G01G 19/393 |
| 2009/0152785 | A1 | | 6/2009 | Komiya et al. |
| 2010/0100241 | A1 | | 4/2010 | Jarisch et al. |
| 2012/0207574 | A1 | | 8/2012 | La Rovere et al. |
| 2013/0232021 | A1 | | 9/2013 | Hagglund |
| 2014/0027186 | A1 | | 1/2014 | Kawashima |
| 2014/0287068 | A1 | | 9/2014 | Lewis et al. |
| 2014/0298511 | A1 | | 10/2014 | Lewis et al. |
| 2014/0324660 | A1 | | 10/2014 | Bolno et al. |

FOREIGN PATENT DOCUMENTS

| | | |
|---|---|---|
| CN | 1089062 | 8/2002 |
| CN | 103497823 | 1/2014 |
| DE | 3500076 | 7/1986 |
| EP | 0 210 005 | 1/1987 |
| EP | 0 597 116 | 5/1994 |
| EP | 0 743 509 | 11/1996 |
| GB | 2 116 732 | 9/1983 |
| GB | 2 389 316 | 12/2003 |
| JP | 3088751 | 9/2000 |
| JP | 2004026191 | 1/2004 |
| JP | 3647549 | 5/2005 |
| JP | 2010112779 | 5/2010 |
| JP | 4884179 | 2/2012 |
| WO | WO 9323724 | 11/1993 |
| WO | WO 03097141 | 11/2003 |

\* cited by examiner

METHOD AND APPARATUS FOR SORTING AND COMBINING FRAGILE AND VARYING DENSITY PIECES

PRIORITY CLAIMS/RELATED APPLICATIONS

This application claims the benefit under 35 USC 119(e) of and priority under 35 USC 120 to U.S. Provisional Patent Application Ser. No. 62/142,480, filed Apr. 3, 2015 and entitled "Method And Apparatus For Sorting And Combining Fragile And Varying Density Pieces", the entirety of which is incorporated herein by reference.

FIELD

The disclosure relates generally to a system and method for weighing a plurality of pieces having different weights and/or densities and determining a combination of the pieces for subsequent processing of the combination of pieces.

BACKGROUND

Weighing systems have existed that weigh pieces and combine the pieces into a package having a predetermined weight. These current weighing systems use a manual method or a "deli" weight method. The manual method requires people picking through a pile of pieces, choosing potential pieces that look and feel like they might combine to achieve the target weight and if not, then the process of substituting pieces begins until weight falls within a fixed weight tolerance. The current weighing systems have a number of problems. For example, the manual process is labor intensive, costly, inefficient and results in large variances in final weights.

The deli weight method can be done manually or automatically with a machine, but due to the inaccuracy of the process, a volumetric approach is used to estimate the weight and the final weight may not fall between upper and lower limits. The deli method has its own problems. Specifically, the deli weight method does not have the required precision and often more than the desired target weight limit is put into packages resulting in lost profit.

Some other problems with current solutions are that they are manual in nature, highly inefficient, highly inaccurate and prone to damaging pieces. This can result in high cost, reduced profits, lower quality product shipped to market, brand tarnishing and other problems.

An additional conventional method is to use an automated multihead weigher system. This system uses conveying apparatus which load vibratory dispersion devices. Material is then dispersed into multihead weighers or buckets with weighing capability. Challenges are numerous with these type systems for some products. For instance, some products interlock to form larger pieces that exceed the target weight and thus must be recycled and reworked. The product being weighed can also be abused during conveying, vibration and dropping which have a negative effect due to loss in valuable residue which reduces efficacy or increases particulates which can stick to system surfaces. Finally, the low number of piece weight options available to combine and achieve lower and upper weight control limits is inefficient.

BRIEF DESCRIPTION OF THE DRAWINGS

The figures provided represent only example embodiments, and should not be construed as fully representing the scope and spirit of the disclosure.

DETAILED DESCRIPTION OF ONE OR MORE EMBODIMENTS

Figure 1:
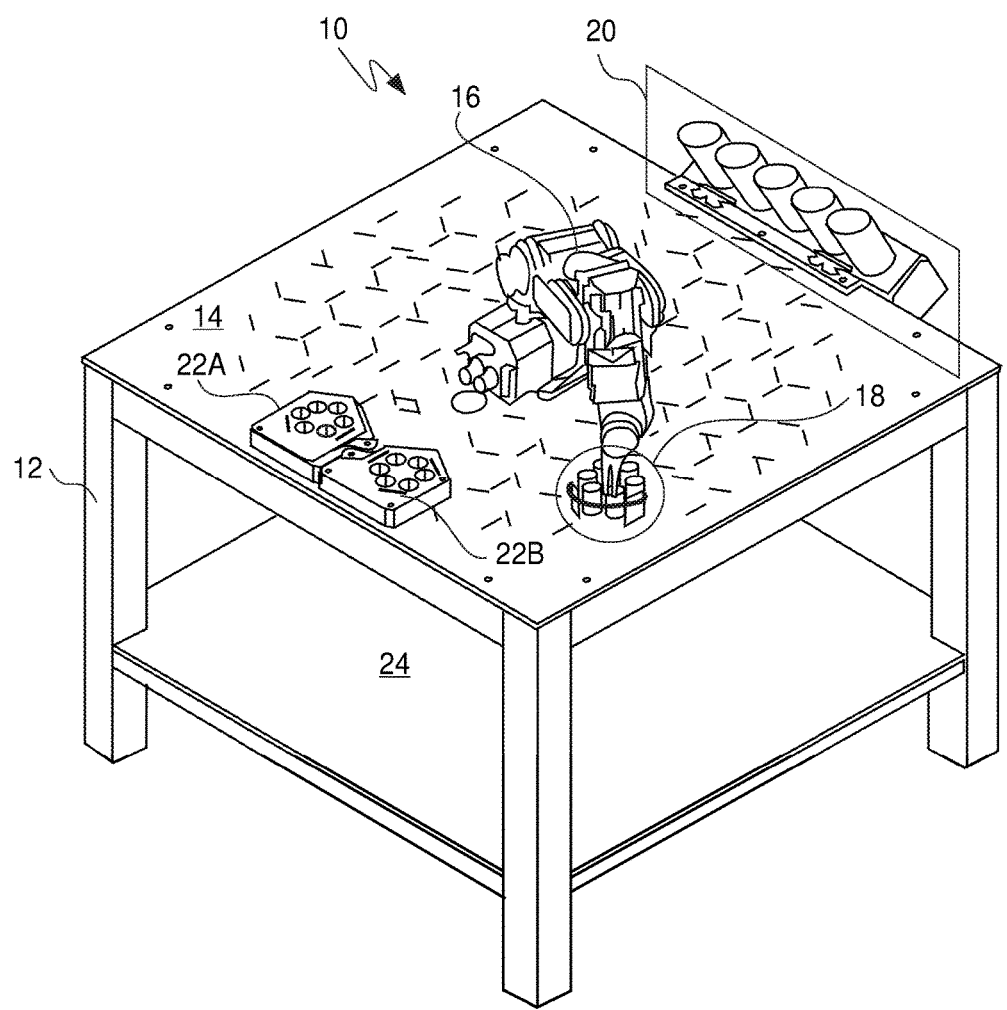
FIG. 1 illustrates a first embodiment of a weighing and processing system with a single cup-tray placed on a work surface.

The disclosure is particularly applicable to a weighing and processing system that may be used for weighing and processing cannabis pieces and it is in this context that the disclosure will be described. It will be appreciated, however, that the system and method has greater utility since the weighing system disclosed may be used to weigh and process various pieces of product, such as fragile pieces, sticky pieces, interlocking pieces, toxic pieces, radioactive pieces, minerals and/or any other pieces of product in which it would be desirable to be able to weigh pieces of possible different weights and/or densities and combine the pieces for subsequent processing. The subsequent processing may be, for example, the packaging described in the examples below, but may also be other processing of the combination of pieces such as processing of radioactive pieces, cleaning of the pieces and any other processing that it may be desirable to perform on the combination of pieces.

A system, method, and apparatus for, in general, grouping items for packaging and, in particular, grouping variable pieces of items into sets or groups that fall within target weight ranges are provided. Within a given type of items to be sorted, there may be variation in density, weight, and size from one piece to another. Although there is variation from piece to piece, each grouping should fall within a narrow standard deviation of the target weight range per grouping for the package. The system and method automates the grouping or combining of variable pieces into sets or groups that fall within preset target weight ranges with precision. The automation aspect allows the grouping or combining of the variable pieces to be done at high, industrial-level speeds. The system and method can achieve, within acceptable parameters, precise groupings of pieces at a rate of thousands of pieces sorted or grouped per production day.

Another aspect of the system and method is its ability to handle variable, fragile items with the precision mentioned. The system and method makes use of autonomous or mechanized equipment, capable of carrying out logical steps, such as a robot, to limit the handling of fragile items, while retaining precision of grouping, at industrial speeds. Limiting the handling makes it so that the fragile items are not damaged while sorting or grouping and thus achieving a better quality product.

In one embodiment, a robotic part of the system and any associated processing device that is capable of carrying out logical steps, weighs each piece or load, puts it into an array containing as many pieces as required to meet the target weight standard or goal. As an example, the system allows for choosing whether a given piece may be placed in set A, B, or C; it chooses depending on overall weight of the group and not based on the number of pieces or the size of the pieces that may be placed in those groups. The system and method may be programmed to complete a variety of complex logical steps in order to achieve a set of standards or goals. Given a multitude of pieces, the system and method calculates the possible combinations of pieces that can meet the target weights to make up the sets or groups.

Figure 2:
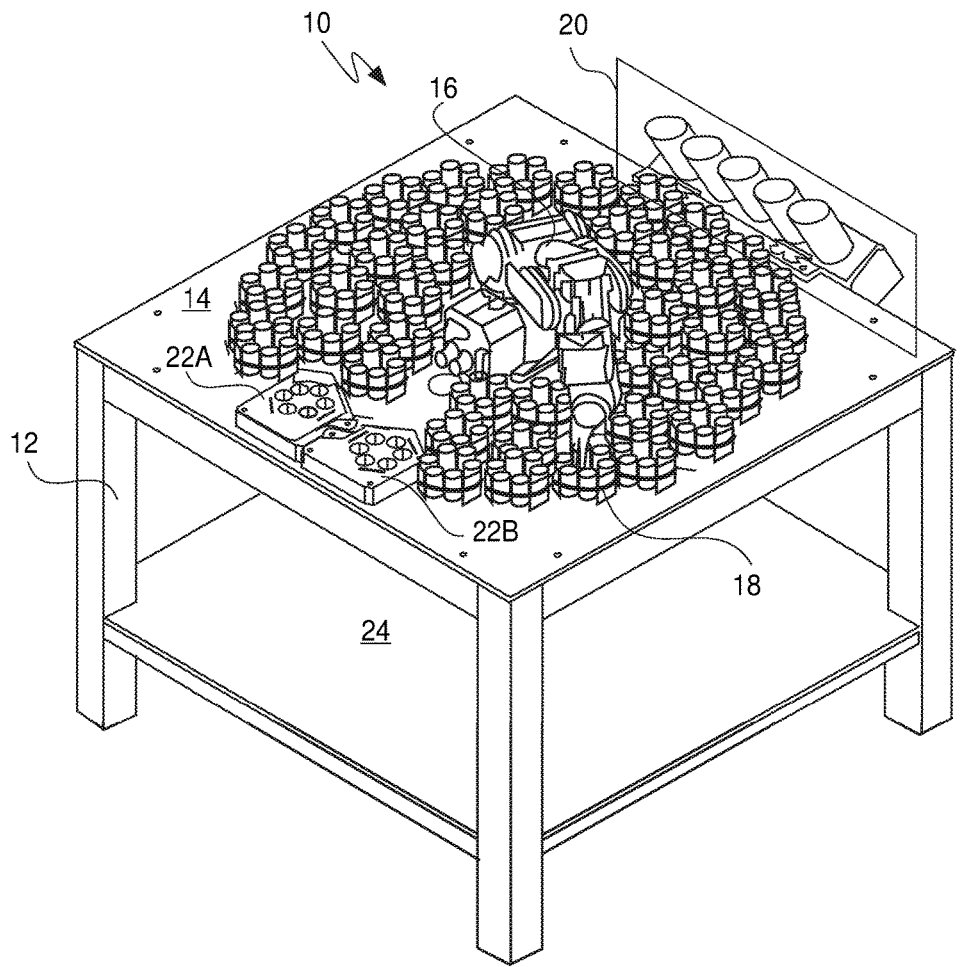
FIG. 2 illustrates the first embodiment of the weighing and processing system with a plurality of cup-trays placed on the work surface.

FIG. 1 illustrates a first embodiment of a weighing and processing system 10 with a single cup-tray 18 placed on a work surface 14 of the weighing and processing system to weigh pieces having disparate weights and further process the pieces. In one embodiment, the system may pack the one or more of the pieces into a package so that the package has a predetermined weight (within tolerances) based on the one or more pieces selected for the package. FIG. 2 illustrates the first embodiment of the weighing and processing system 10 with each of the cup-trays 18 placed on the work surface 14.

The system 10 may have a structure 12 upon which the weighing and processing operations may be performed. The structure 12 may be, for example, a table as shown in FIG. 1, but the weighing and processing system is not limited to any particular structure 12. The structure may have the work surface 14 that may be on top of the structure, part of a top surface of the structure or various other arrangements. The work surface 14 may identify a location for each cup/tray 18 on the work surface after each piece in each cup for a tray has been weighed as described below in more detail. This embodiment of the system 10 may also have a robot 16 that may be located adjacent to or above the work surface (such as at the center of the work surface as shown in FIG. 1) so that the robot can pick up each cup/tray 18 once it is weighed, place each cup/tray into a predetermined location on the work surface, pick up each cup in each tray and deposit the one or more pieces in the cup into one of a plurality of processing bins 20 and return the cup to its original location in the work surface once the cup is empty. Alternatively, the empty cup may be relocated and deposited into a receptacle separate from the tray that the cup was originally in. The robot 16 also may be located such that the robot is able to access each location on the work surface (and thus each cup/tray 18 when the working surface is fully occupied), a weighing scale 22 on or adjacent the work surface and each of the processing bins 20 located adjacent to the work surface 14.

The system 10 may also have a plurality of cup/trays 18 (one is shown in FIG. 1 however FIG. 2 shows the work surface 14 with a plurality of cup/trays 18 at different locations on the work surface). Each cup may be a piece repository. Each tray may hold a predetermined number of cups, such as six in the embodiment shown in FIG. 1, although the system is not limited to any particular number of cups in each tray and the system may be fewer or more cups in each tray than shown in FIG. 1. Each cup in each tray may contain one or more pieces of product when each of the cups is filled with pieces of product. The tray facilitates handling of the cups. In other embodiments, the system may be operated with only the cups in which the cups may be placed on the work surface.

In one embodiment, a batch or non-sorted approach may be used to initially fill the cups with pieces of product. In particular, no pre-sorting of the pieces is performed and a batch (pile) of product pieces may be provided to the operator. The operator may obtain pieces from the pile or supply system and manually load cups into trays (post taring of the empty cups.) Random pieces of varying sizes may be place into the cups with no pre-sort and the operator does not attempt to predict or screen piece population. The operator may place a single piece or multiple pieces into each cup.

The system also may have the plurality of processing bins 20 adjacent the working surface so that the pieces in the cups may be placed into each of the processing bins so that the total weight of the pieces in each processing bin may be a predetermined weight. In the example in FIG. 1, there may be five different processing bins although the system is not limited to any particular number of processing bins and the system may be fewer or more processing bins than shown in FIG. 1. Thus, in operation, once the pieces in the cups have been weighed, the system may determine a combination of one or more pieces in the cups to place into each processing bin (so that each processing bin has a predetermined weight) and the robot may place the pieces from the selected cups into that processing bin.

Figure 17:
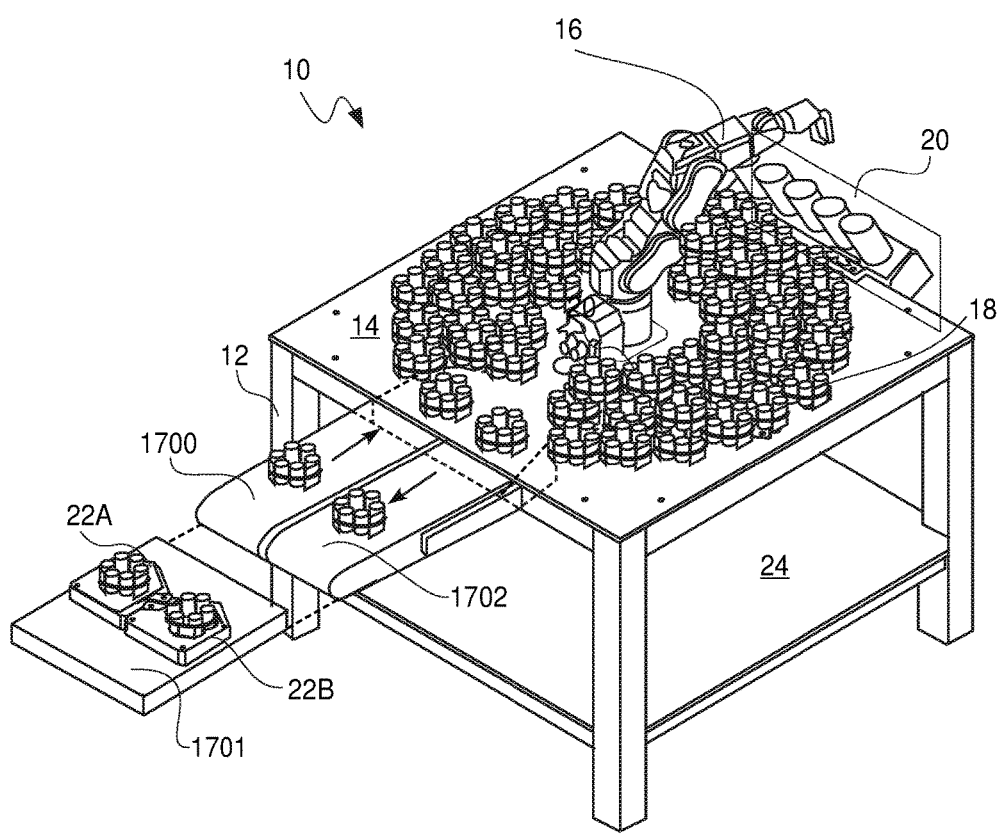
FIG. 17 illustrates a second embodiment of the weighing and packaging system with continuous throughput weighing and processing.

The system also have one or more multi-piece weighers 22 that may be adjacent the work surface 14 or attached or on to the work surface 14 as shown in FIG. 1 or may be separately located from the work surface as shown in FIG. 17. In one implementation, the system 10 may have two multi-piece weighers 22A, 22B as shown in FIG. 1 although the system is not limited to any particular number of multi-piece weighers and the system may be fewer or more multi-piece weighers than shown in FIG. 1. Each multi-piece weigher 22 may simultaneously weigh one or more pieces of product in each cup of the system that is in turn in a cup/tray 18. Note that the configuration of the multi-piece weigher 22 shown in FIG. 1 has six weighing stations that weight each of the six cups in each cup/tray 18 as described above. If a different configuration of each cup/tray 18 is used with more or less than six cups, each multi-piece weigher 22 may be redesigned to accommodate the different number of cups. For example, if the system was manufactured with eight cups in each tray, the multi-piece weigher 22 may be configured to have eight weighing stations so that each cup in each tray may be simultaneously weighed.

The system 10 also has a computer system 24 that performs various operations of the system. The computer system 24 may be separate from the robot 16, integral to the robot or partially implemented using the computer logic within the robot. The computer system 24 may be implemented in hardware or software. If the computer system is implemented in software, the computer system may be one or more processors, memory and other components on a typical computer system and a plurality of lines of computer code that may be executed by the processor to control the system so that the processor is thus configured to perform the processes as described below. If the computer system is implemented in hardware, the computer system may be one or more integrated circuits, one or more microcontrollers and the like that perform the processes as described below. The computer system 24 may, among other things, control the operations/movement of the robot (possibly in combination with robot control system that is internal to the robot 16) as described above. The computer system may also store the weight of each cup measured by the multi-piece weigher 22 and store a location on the work surface in which each cup/tray 18 is placed by the robot. In one embodiment, the computer system may store the weights and locations into a database. The computer system also may determine a combination of pieces that will be placed into each processing bin based on the weights and locations of the cups so that each processing bin has a predetermined weight and send commands to the robot to select the cup(s) with the pieces for each processing bin and place the combination of pieces into the processing bin. The computer system may also generate other robot commands to move the cup and trays, such as moving them onto or off of the conveyor shown in FIG. 17. The computer system also may generate visible or audible instructions to an operator when the system is being used in a manual mode.

Once the combination of pieces are in each processing bin, further processing of the combination of pieces in each bin may be performed. The further processing may be a packaging process carried out by a packaging machine that packages each combination of pieces or material into a package. As another example, the combination of pieces may be handled by robot to transport the combination of pieces to another process such as might occur for toxic or radioactive material or pieces.

Figure 3:
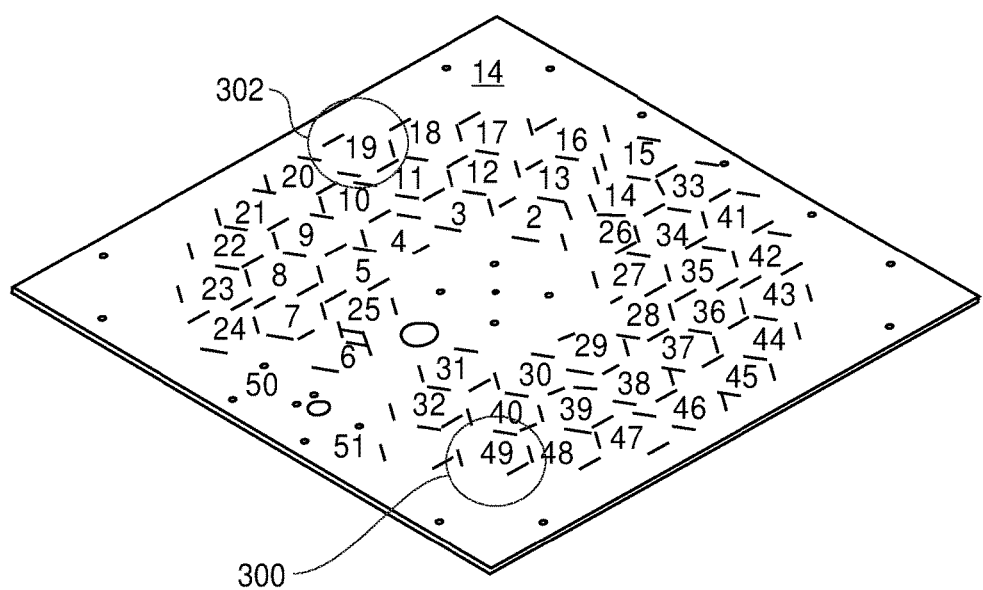
FIG. 3 illustrates an example of the tray locations on the work surface of the weighing and processing system.

FIG. 3 illustrates an example of the tray locations on the work surface 14 of the weighing and processing system 10. As shown, the work surface may contain a plurality of trays at a plurality of tray locations, such as tray location 18 indicator 302 and tray location 49 indicator 300 as shown in FIG. 3. In the embodiment of the system in which the robot 16 is used to pick and place the trays to and from the work surface 14, the work surface may or may not have actual visible locators as shown in FIG. 3 since the robot 16 may be programmed to be able to identify each location and whether or not that tray location already has a tray sitting in it or the work surface may have non-visible indicators. In an embodiment in which a human being may pick and dispense the pieces of product into the processing bins (described below in more detail), the work surface 14 may in fact have the visible indicators so that the operator can place the trays in the appropriate locations so that the combination of pieces may be appropriately determined. Specifically, in order to programmatically calculate the appropriate combinations of pieces and instruct the operator as to which pieces from which cups are placed into each processing bin, the system and its computer must know the location of each cup and the weight of each cup. In an embodiment in which the system may be run using a robot or manually with an operator, the work surface may also have the visible indicators. The tray indicators on the work surface, whether visible or not, allows the system to do one or more of the following: 1) ensure that a precise location of each tray (and each of the cups in each tray) are known on the work surface; 2) store the weight of each cup in each tray using the tray location on the work surface as a unique identifier, such as 1 gram in cup 1 of tray 1 at location 19, 0.5 grams in cup 2 of tray 1 at location 18, . . . , 1 gram at cup 6 of tray 50 at location 49 using the example locations shown in FIG. 3; 3) provide instructions to the robot about which piece in which cup(s) in which tray(s) based on the indexed storage locations, such as the pieces in cup 1 of tray 1 at location 19 and the pieces in cup 6 of tray 50 at location 49, are being picked up and deposited into each processing bin when the robot embodiment is implemented; 3) provide instructions to the robot to place the empty trays or bins when the robot embodiment is implemented; 4) provide instruction to the robot to place new trays into certain tray locations or remove tray(s) from certain tray locations when the robot embodiment is implemented; and 5) provide visual or audible instructions to an operator, when using the system in the manual mode, to place and remove trays from the work surface, to pick up and place piece(s) from certain cups in certain trays into each processing bin.

Figure 4:
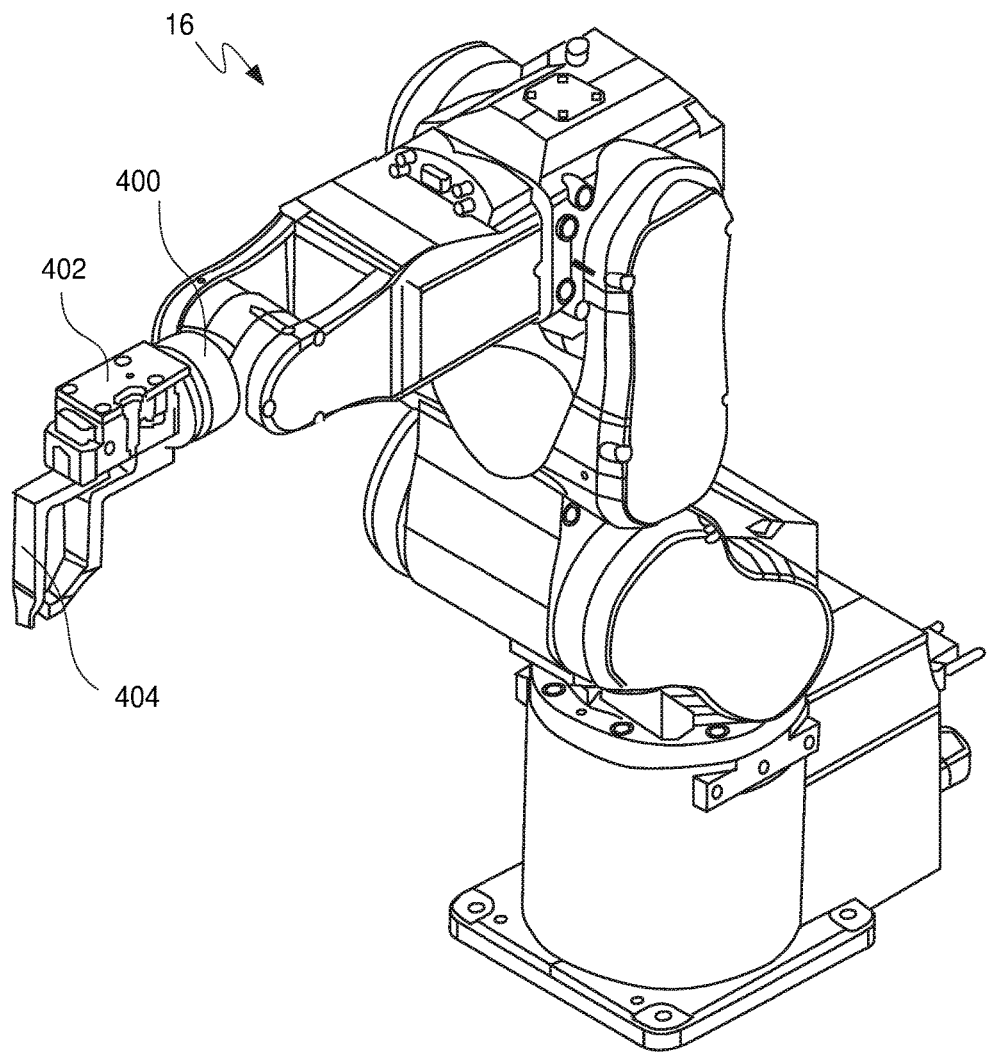
FIG. 4 illustrates an example of a robot that may be used with the first embodiment of the weighing and processing system.

FIG. 4 illustrates an example of a robot 16 that may be used with the first embodiment of the weighing and processing system. In one implementation, the robot 16 may be a commercially available robot. For example, the robot may be a Denso robot (see http://densorobotics.com for further details which are incorporated herein by reference), an Epson robot (see http://robots.epson.com/products/2 for further details which are incorporated herein by reference) or a Kuka robot (see http://www.kuka-robotics.com/usa/en/products/ for further details which are incorporated herein by reference). As shown in FIG. 4, the robot may have a mount 400 for a gripper and a gripper 402 that has a set of fingers 404 for transferring the tray(s) and/or cup(s) on the work surface and/or dump the pieces of product contained in a cup into the processing bins of the system.

Figure 5:
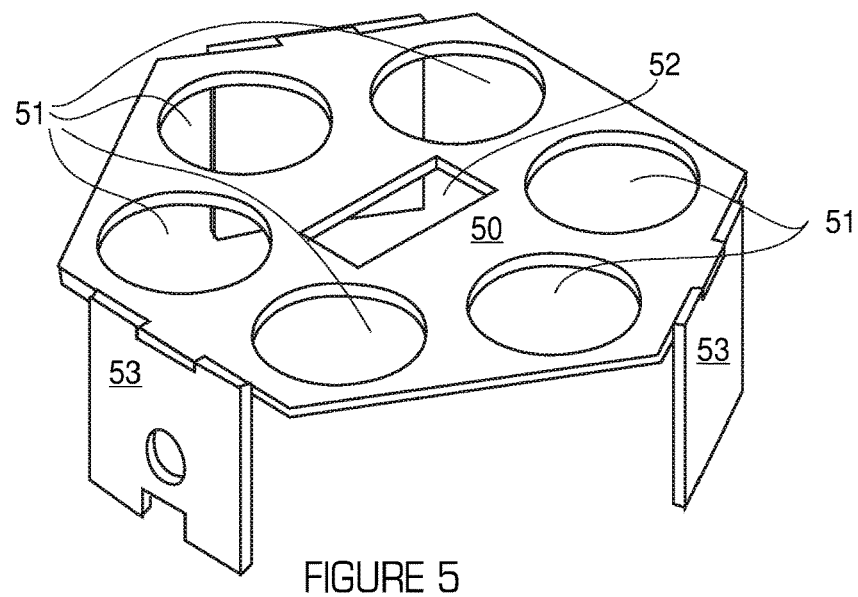
FIG. 5 illustrates an example of the tray that may be used with the weighing and processing system.
Figure 6:
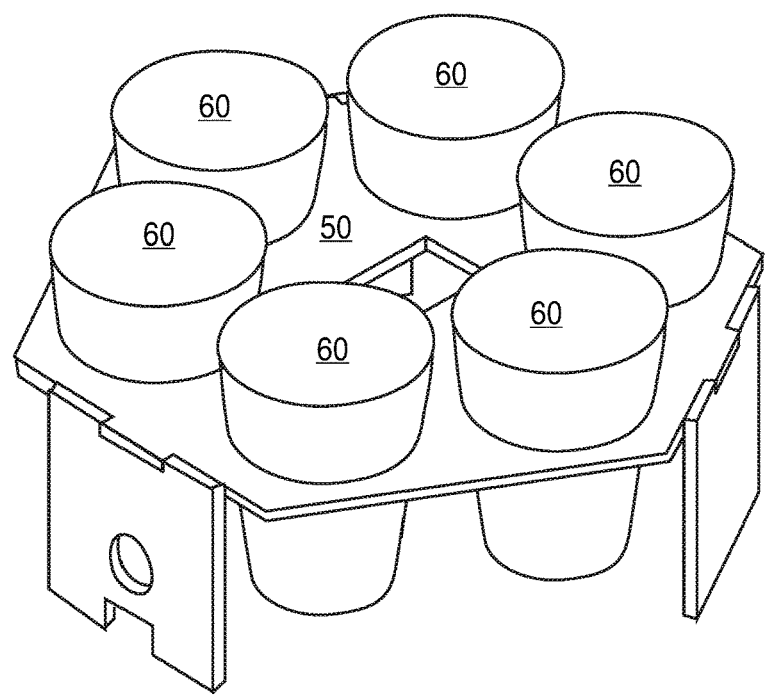
FIG. 6 shows a plurality of cups in the tray shown in FIG. 5.

FIG. 5 illustrates an example of a tray 50 that may be used with the weighing and processing system and FIG. 6 shows a plurality of cups 60 in the tray 50 in FIG. 5. In the example shown in FIGS. 5 and 6, the tray 50 has six cup holes 51 around the perimeter of the tray that may be hexagonal shape wherein each cup hole 51 accommodates a cup 60 as shown in FIG. 6. The tray 50 may further comprise a central cutout region 52 that may be used by the robot 16 to grab each tray when needed. Each tray may also have one or more leg portions 53 so that the tray may rest on the work surface and hold each cup slightly above the work surface. Alternatively, each tray may be configured so that, when the tray with cups are placed on the multi-piece scale 22, each cup may be pushed up slightly so that the cup does not touch the cup hole 51 in the tray to allow isolation of the cup during the weighing process.

Each cup 60 may have a typical cup shape and a flat bottom although the system could be implemented with different shaped and/or sized cups. For example, depending on the product and the pieces of product being weighed by the system, each cup may be a larger or smaller size or a different shape to accommodate the different pieces of the product. The tray 50 and each cup 60 may be made of the suitable material, such as preferably metal or a plastic. It should be noted that different configurations of each cup/tray 18 may be used with more or less than six cups and then each multi-piece weigher 22 may be redesigned to accommodate the different number of cups. For example, if the system was manufactured with eight cups in each tray, the multi-piece weigher 22 may be configured to have eight weighing stations so that each cup in each tray may be simultaneously weighed. Furthermore, other shapes and sizes of the trays and/or cups for specialized applications may be used, while the hexagon shape shown in FIGS. 5-6 may be used to allow for nesting/maximizing trays on the work surface.

Figure 7:
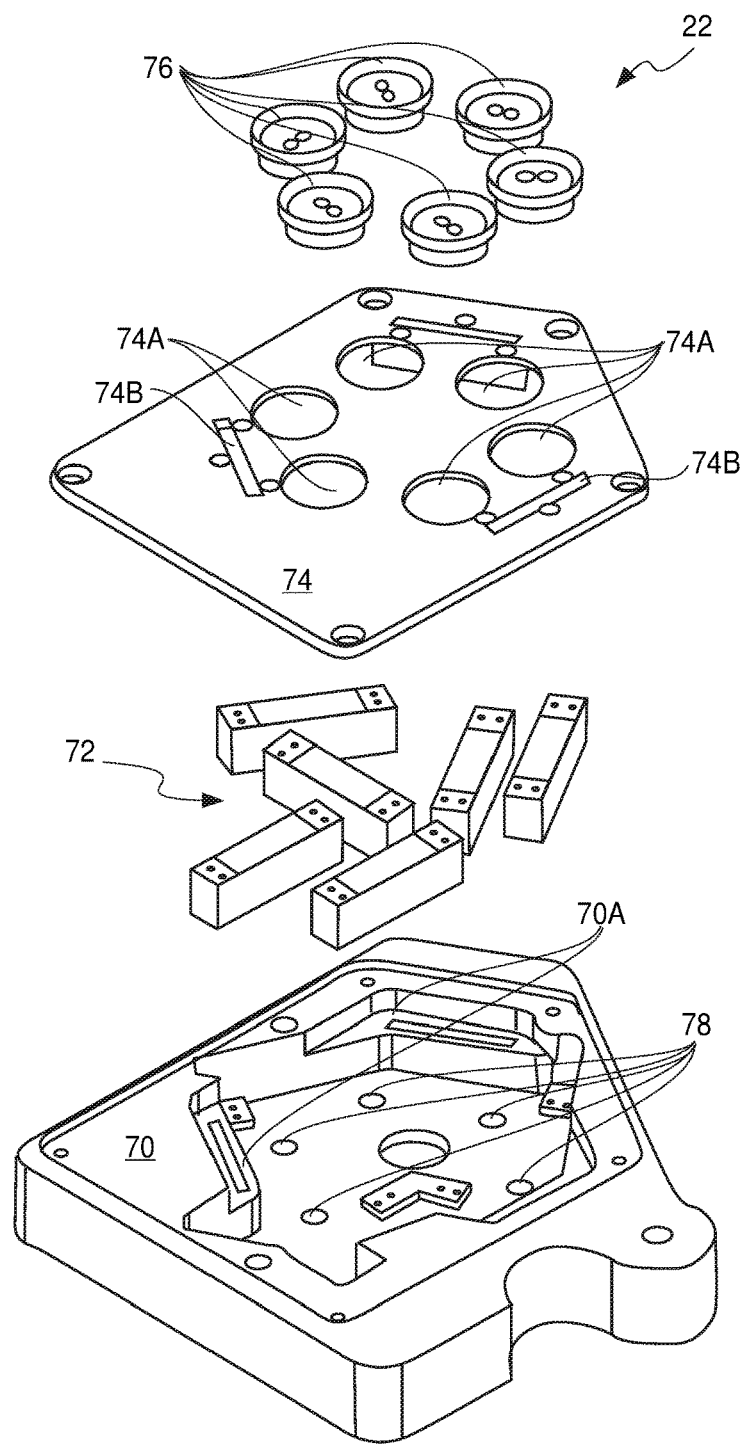
FIG. 7 shows an exploded assembly diagram of the multi-piece scale that may be used in the weighing and processing system.
Figure 8:
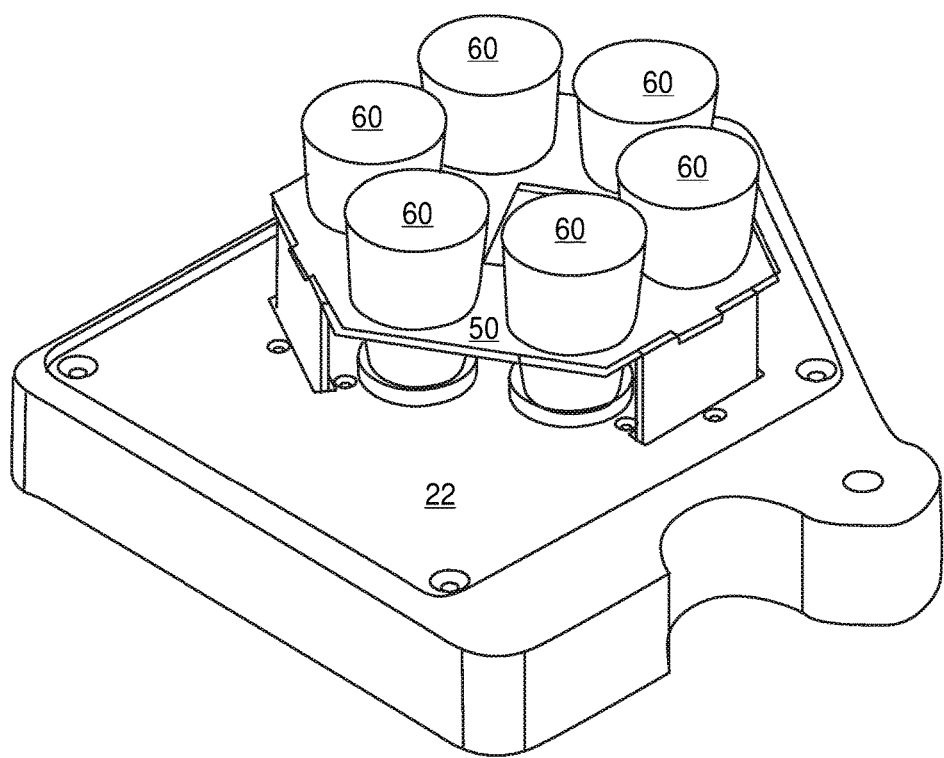
FIG. 8 shows the multi-piece scale with a plurality of cups in the tray on the scale.

FIG. 7 shows an exploded assembly diagram of the multi-piece scale 22 that may be used in the weighing and processing system and FIG. 8 shows the multi-piece scale 22 with a plurality of cups 60 in the tray 50 on the scale. The multi-piece scale 22 may simultaneously weigh multiple cups/units at highly precise low weights (0.01 gm) in a very small area. The multi-piece scale 22 may also center cups through a funneling action provided by a cup seat portion 76 they rest on and the centering prevents false readings caused by interference due to contact with tray 50. The multi-piece scale 22 may measure individual or discrete loads (0-2 grams) in cups 50 simultaneously. In one embodiment, the computer system 24 that is part of the system may then determine which loads to combine to achieve 2-2.3 gram range. An industry specific example of other key weight ranges include 1-1.3 gm or 3.5-3.85 gm that are specific retail package weights (1, 2, 3.5 gm) for the cannabis industry although the system may be used in various different industries that may have different weight ranges. The system is designed, when used to package the pieces of product, to fill each package to a lower and/or upper control limit coinciding with the package weight target.

As shown in FIG. 7 the multi-piece scale 22 may have a base portion 70 that houses the other elements of the multi-piece scale and may also house any electronic circuits that operate the load cells, capture the weight on each cup simultaneously and communicate those weights to a storage device that may be housed in the base portion 70 or may be located in the computer system 24 of the system as shown in FIG. 1. The multi-piece scale 22 may further comprise a plurality of load cells 72, such as one load cell for each cup, so that each cup is weighed individually simultaneously or substantially simultaneously. Specifically, the multi-piece scale 22 may be able to weigh each cup at the same time or with a brief time gap, such as 0.01 seconds, between the weighing of each cup. The load cells may be various commercially available load cells with the desired accuracy of the multi-piece scale. For example, preferred load cell(s) may be LoadStar RAPG-100G-A, RAPG Single Point Load Cell, 100 Gram Capacity with LoadStar DI-1000U Digital Load Cell Interface—Millivolt to USB Convertor-24 Bit. Each load cell 72 may sit in the base portion 70 in a configuration as shown in FIG. 7, for example, so that all of the six load cells fit into a small area. In one embodiment, each load cell 22 may be bolted to the bottom plate 70 and also attached to each cup seat portion 76.

The multi-piece scale 22 may further comprise a top plate 74 that has the same shape as the base portion 70 and may attach to the base portion. The top plate 74 may have one or more weighing regions 74a and each weighing regions 74a has a hole to allow the load cell underneath that weighing regions 74a to weigh the cup seat portion 76 that has passed through the hole which cup 60 rests upon in that weighing region 74a. The top plate 74 may further comprise one or more tray 50 alignment/centering regions 74b and may have the same number of alignment/centering regions 74b as the number of legs 53 on the tray. Each alignment/centering region 74b may be a slot through which the leg 53 of the tray passes when the tray is placed into the multi-piece scale 22. When the tray is placed into the multi-piece scale 22 passes through the respective alignment/centering region 74b slot and into a respective recess 70a in the base portion 70 to center/align the tray and cups with the load cells so that accurate measurements of the weight of the piece(s) in each cup is measured. The combination of each weighing region in the top plate 74, the cup seat portion 76 and load cell 72 in the scale 22 may be a weigh station for each cup.

The multi-piece scale 22 may further comprise a plurality of cup seat portions 76 into which each cup rests when each of the multiple cups are being simultaneously weighed. Each cup seat portion 76 may further center the cup with respect to its load cell. Seat portions 76 have multiple functions including enabling the utilization of single point load cell. Single point load cells provide precision weighing capability by concentrating load at a single point and the seat portion enlarges the single point surface area to accommodate cup 60 base area. The seat portion may also center the cup over the load cell 72 single point area. The seat portion also elevates the cup 60 so it separates from tray 50 (if cup 60 is in contact with tray 50 then erroneous weigh measurement can result). The seat portion 76 also may prevent damage to load cells 72 such as via overloading (down, up and side forces). The seat portions 76 may also seal, guard, and prevent debris from accumulating under top plate 74 and affecting load cell functionality. Basically, seat portions 76 centers, elevates and prevents load cell 72 damage. The combination of the elements shown in FIG. 7 permits the multi-piece scale 22 to precisely measure the one or more piece(s) in each cup simultaneously. The multi-piece scale 22 may further comprise one or more overload protection elements 78 which may be set screws/fixtures and mechanisms to prevent an overload of the load cells 72.

Figure 9:
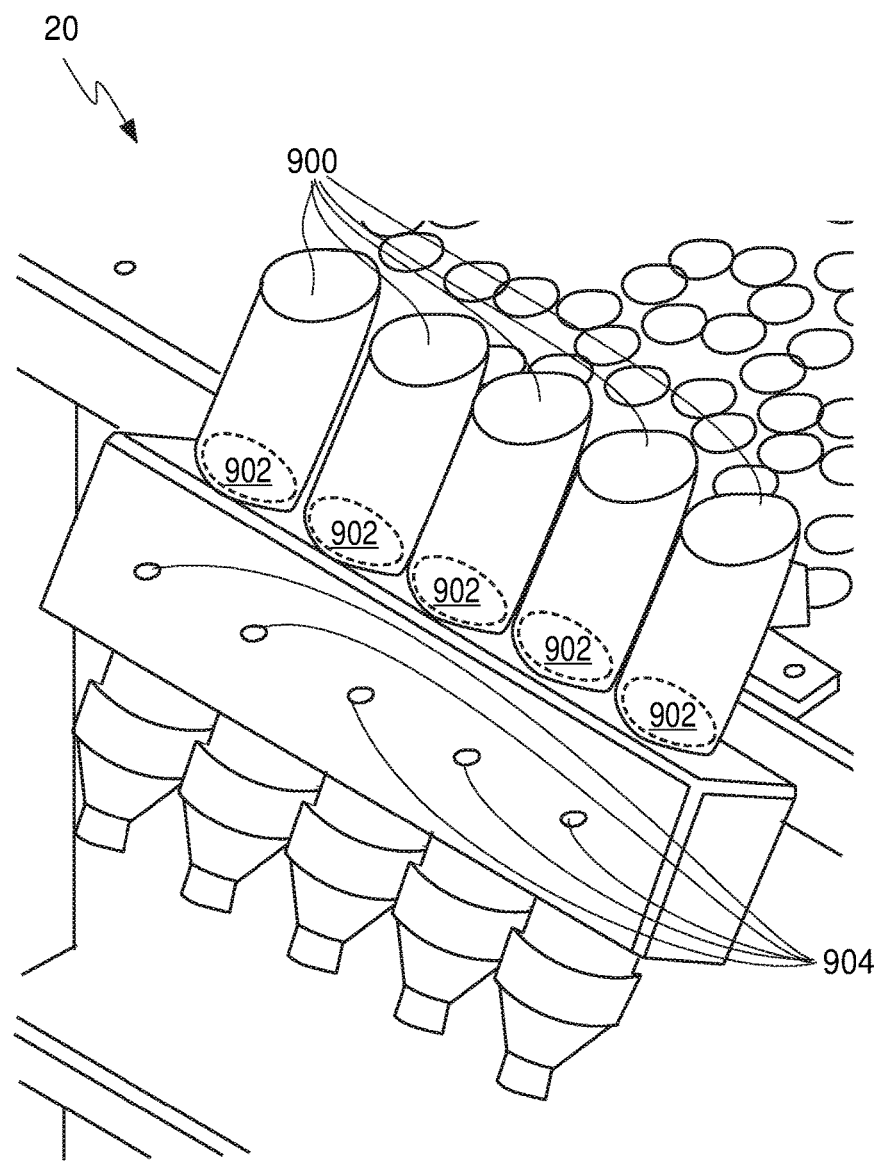
FIG. 9 illustrates more details of the processing bins of the weighing and processing system.

FIG. 9 illustrates more details of an embodiment of the processing bins 20 of the weighing and processing system. In the embodiment shown, there may be five separate processing bins 900. Each processing bin has a top portion 900 into which the pieces of product are placed by the robot (or manually) and a lower portion so that the combination of pieces placed into the processing bin may be output to a subsequent processing step such as packaging or other handling processes. Subsequent packaging processes can include bottling, canning, filling and sealing, atmospheric packing etc. Each processing bin 900 may further comprise a visual indicator 902 that provides a visual signal (such as a light within each processing bin) indicating that all of the pieces of product have been deposited in the processing bin and is ready for further processing, such as packages of the one or more pieces of product. Each processing bin may further comprise a button 904 to signal that the bin is clear and ready for a next deposit of one or more pieces of product. Each button 904 may also generate a signal that is communicated to the computer system 24 and used by the program logic of the computer system.

Figure 10:
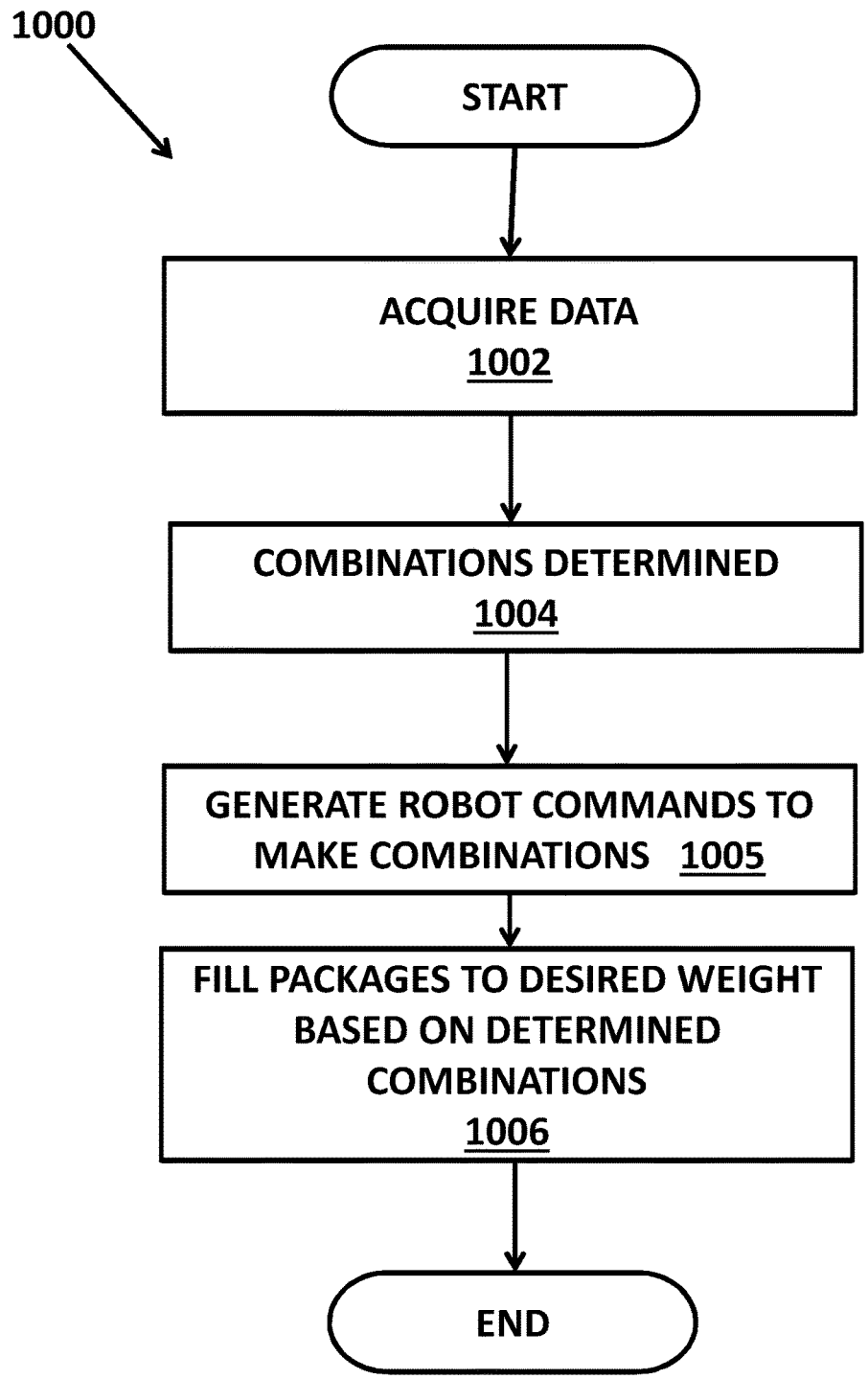
FIG. 10 illustrates a method for weighing pieces using the weighing and processing system.

FIG. 10 illustrates a method 1000 for weighing pieces using the weighing and processing system. The method may be accomplished by the embodiment of the system shown in FIGS. 1-9, but may also be implemented using other systems. In the method, weight data for each one or more piece(s) of product may be acquired (1002). The weight data may be acquired using the multi-piece scale 22 shown in FIGS. 7-8 above that may be attached to the work surface 14 or the weigh data may be acquired by a weighing station that is remote from the work surface 14 on which the combination of piece(s) are processed as described below. In some embodiments, the weights may be stored in a storage device, such as a database, and then analyzed as described below. Once some portion or all of the weight data has been acquired 1002 for a particular processing session, one or more combinations of pieces 1004 of product that meet a weight criteria (1004) for the subsequent processing steps are determined. In one embodiment, commands may be issued to the robot (or human being) (1005) to deposit the determined combination of pieces into each processing bin for the subsequent processing steps.

In one embodiment in FIGS. 1-9, the computer system 24 may perform the determinations of the combinations 1004 by executing a plurality of lines of computer code that perform the calculations and determinations of the combinations. The weight criteria 1004 used for each combination may be a total weight that is more than or equal to a target weight (such as 2 grams) and/or a total weight that is less than an upper limit control weight. The combination of pieces of product may be one or more pieces that make up each combination. For example, if the acquired weights are:

Cup 1 in Tray 1—1 gram
Cup 3 in Tray 4—0.5 grams
Cup 6 in Tray 7—2.1 grams
Cup 3 in Tray 3—0.8 grams
Cup 4 in Tray 2—1.6 grams
Cup 5 in Tray 5—0.4 grams and the target weight is 2 grams and the upper limit is 2.3 grams, the combinations that may be determined may be:

Combination 1=the pieces in Cup 3 in Tray 4 (0.5 gm) and the pieces in Cup 4 in Tray 2 (1.6 gm) that weigh a total of 2.1 grams which meets the target weight criteria Combination 2=the pieces in Cup 1 in Tray 1 (1 gm), the pieces in Cup 3 in Tray 3 (0.8 gm) and the pieces in Cup 5 in Tray 5 (0.4) that weigh a total of 2.2 grams which meets the weight criteria; and Combination 3=the pieces in Cup 6 in Tray 7 (2.1 gm) that weigh 2.1 grams which meets the weight criteria.

In an embodiment in which the subsequent processing process if packaging, the determined combination of pieces may be placed into packages (1006). The placement of the combination of pieces into packages may be done via robot (embodiment in FIGS. 1-9) or manually (embodiment in FIGS. 19-20).

Figure 11:
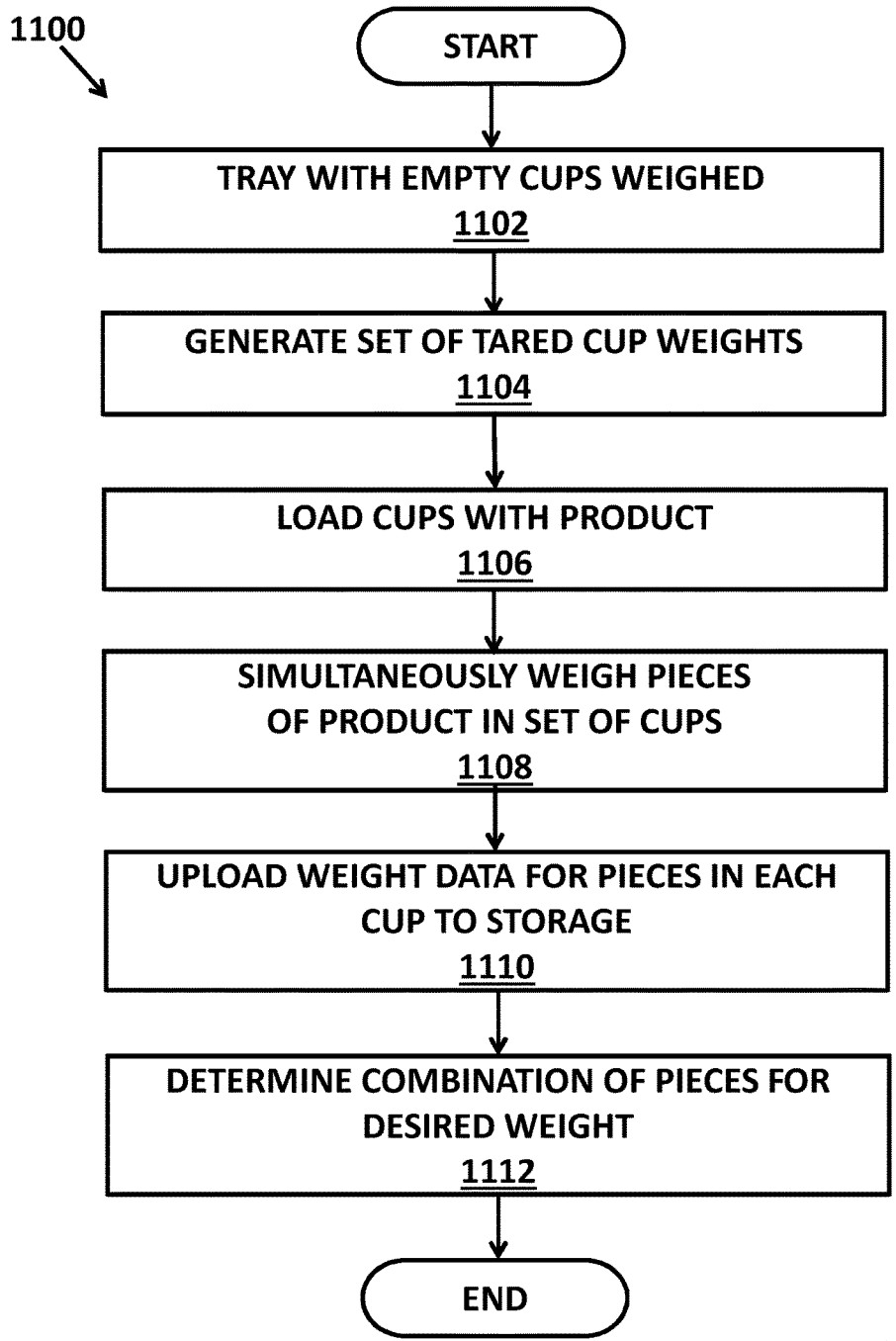
FIG. 11 illustrates a data acquisition process.

FIG. 11 illustrates a data acquisition process 1100 that may be implemented by the system in FIGS. 1-9. To acquire data, the system may weigh the empty cups in a each tray (1102) when the trays and cups are used for the system. If the system is only using the cups, each cup is weighed. The system may then generate and store the set of tared cup weights (1104), such as to the storage device or in the computer system 24. One or more pieces of products for each cup may be loaded into each cup (1106) such as by the operator or by a machine. Using the multi-piece scale(s) 22, the system may simultaneously weigh the one or more pieces of product in each cup (1108). Note that the weighing of each cup also may be substantially simultaneously since the weighing process for each cup may be completed with milliseconds differences in time. Once the payload weight of each cup has been determined, the weight data for each payload may be uploaded (1110) to storage. In some embodiments, it may not be necessary to upload the weights in order to determine the combination of pieces since the determination of the combination of pieces may occur in the multi-piece scale using a processor or may be processed in real time by the computer system. The system may then determine a combination of pieces to achieve the desired weight (1112). The determination of the combination of pieces may be performed, for example, by the computer system 24 and its processor based on a plurality of lines of computer code executed by the processor. An example of the determination of the combination of pieces was described above.

Figure 12:
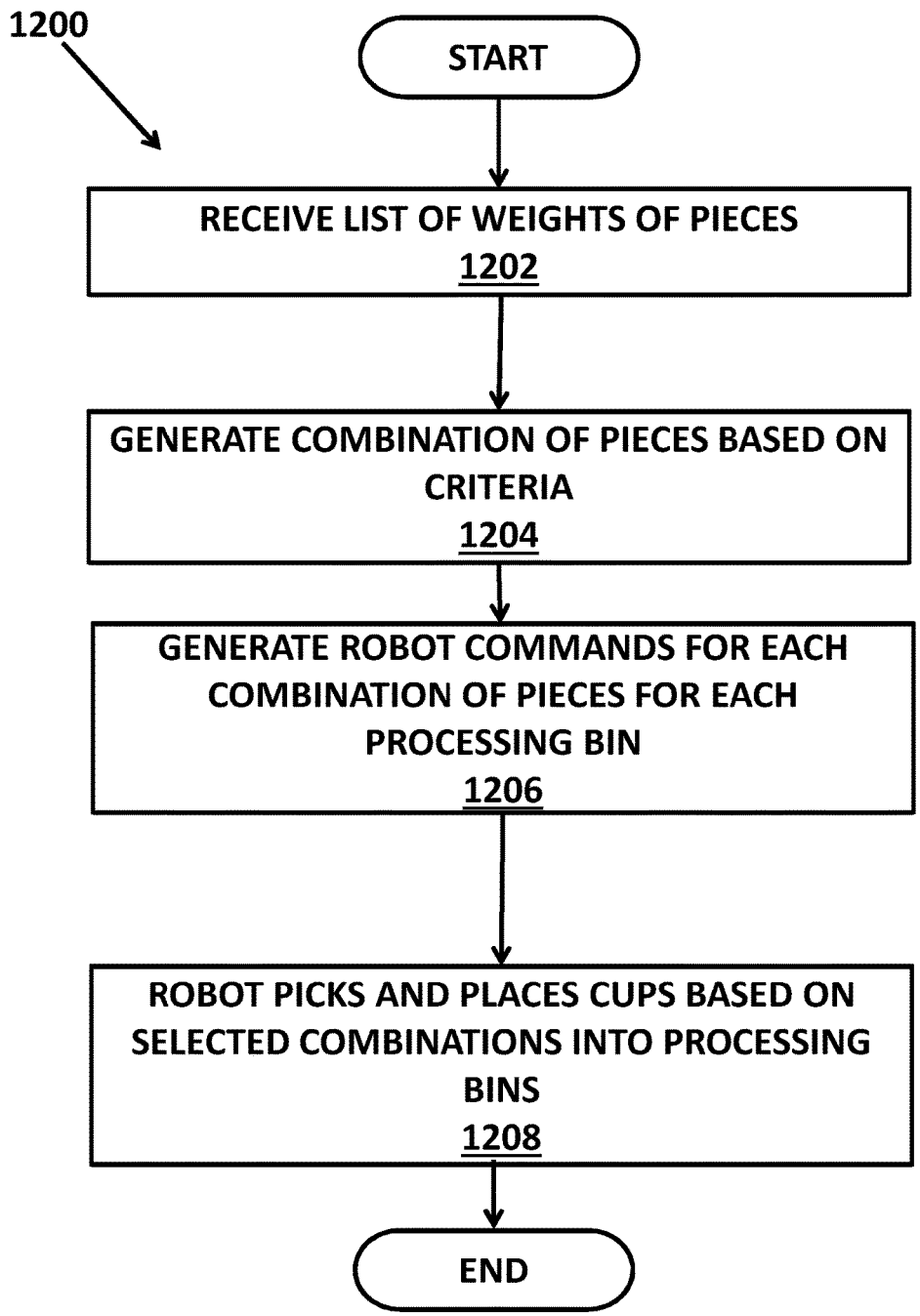
FIG. 12 illustrates a process for determining the piece combinations.
Figure 13:
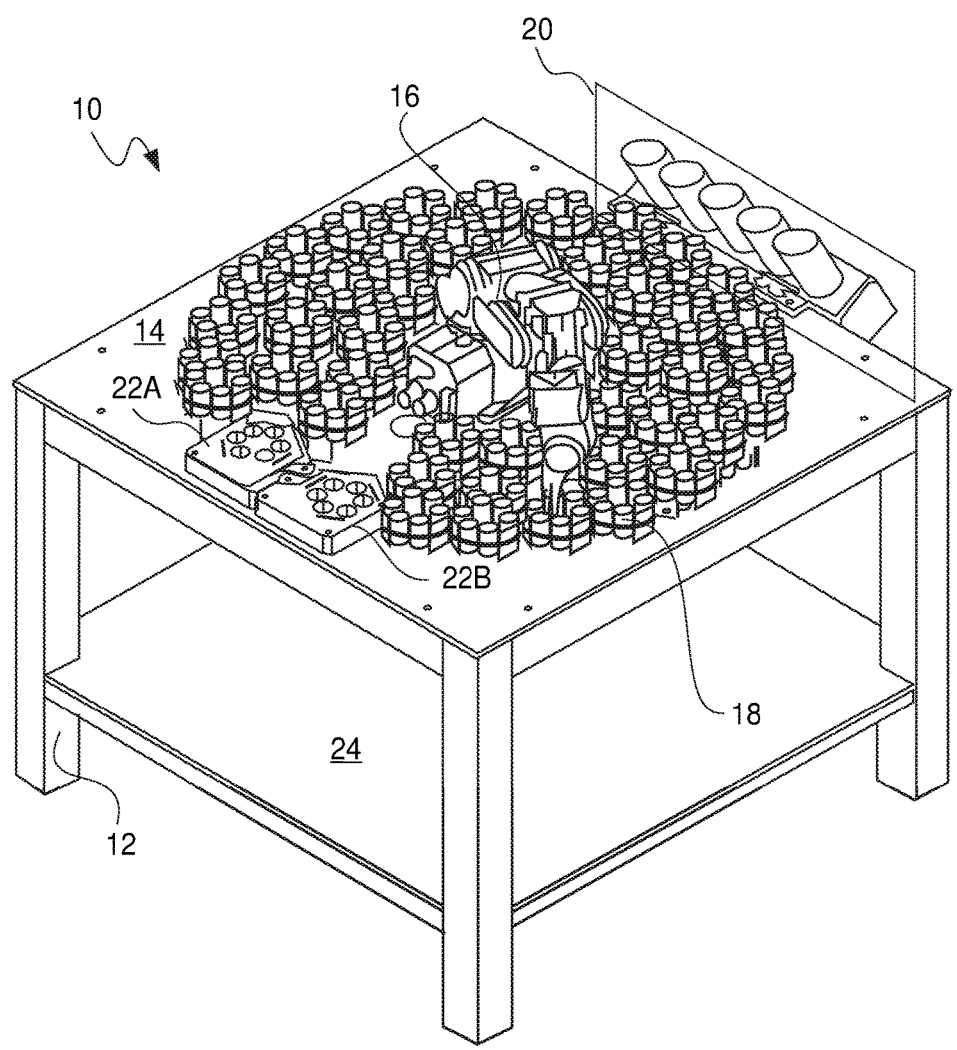
FIG. 13 illustrates the robot of the weighing system picking up an individual cup.
Figure 14:
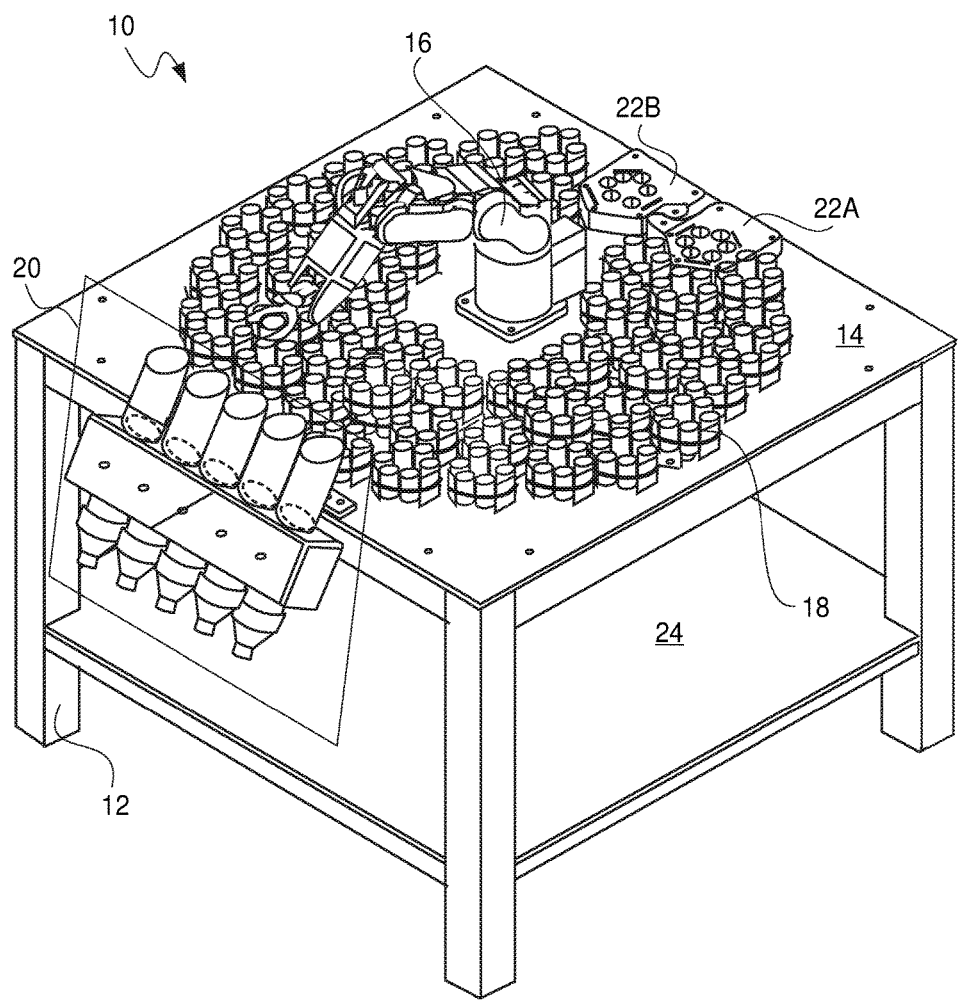
FIG. 14 illustrates the robot of the weighing system during cup dispensing into the processing bins.
Figure 15:
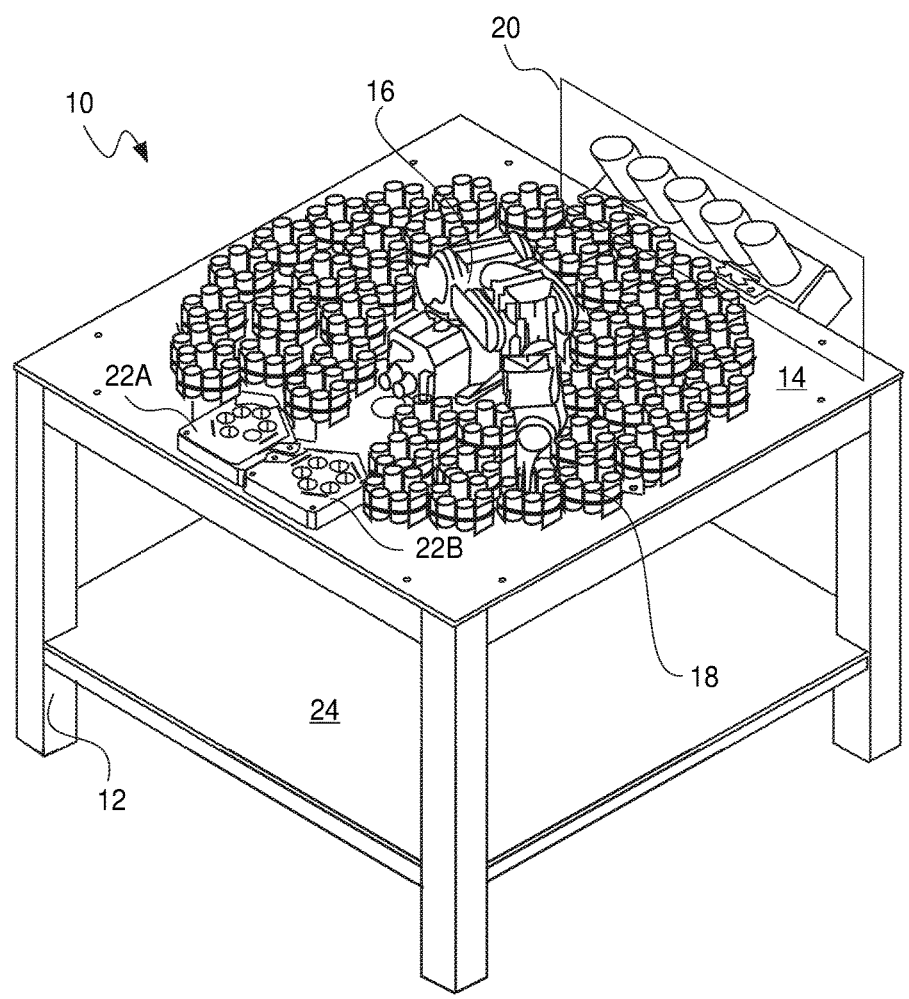
FIG. 15 illustrates the robot of the weighing system returning an individual cup.

FIG. 12 illustrates a process 1200 for determining the piece combinations. In one embodiment, the computer system (along with its processor and plurality of lines of computer code that may be executed by the processor) may perform the processes shown in FIG. 12. Thus, the weights of the pieces in each cup may be received (1202) and the combination of pieces based on certain criteria (1204) may be determined as described above. Once the combination of pieces for the pieces in the cups on the work surface is determined, commands to the robot for each combination of pieces for each processing bin (1206) are generated (by the computer system 24 or using a processor that is part of the robot 16) to deposit the combination of pieces into each processing bin. The robot may then pick and place the cup(s) on the work surface to place the combination of pieces into each processing bin (1208). An example of the robot picking up a cup from the work surface is shown in FIG. 13 and an example of the robot depositing the one or more pieces in a cup into a processing bin is shown in FIG. 14. Once the one or more pieces in each cup has been deposited into the processing bin, the robot may return each cup to its place on the work surface as shown in FIG. 15. Thus, at this point, each of the processing bins has one or more pieces of products whose total weight is within the certain weight criteria.

Figure 16:
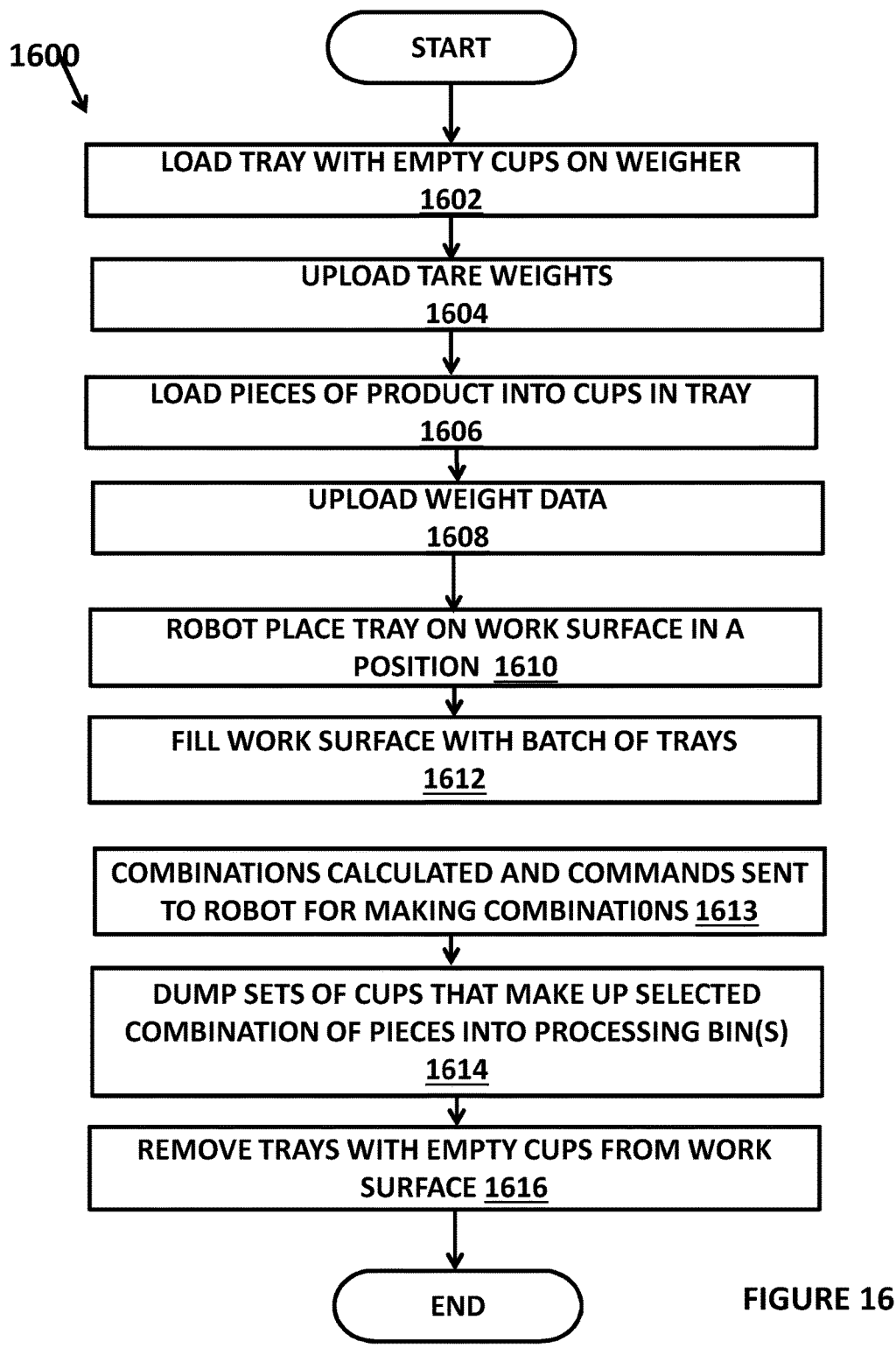
FIG. 16 illustrates a batch weighing process.

FIG. 16 illustrates a batch weighing process 1600. The processes shown in FIG. 16 may be performed, for example, by the computer system 24 and the robot 16. During the batch weighing process, each tray with empty cups is loaded onto the multi-piece scale (1602) and the tare weights for each empty cup (1604) may be determined and uploaded to the computer system 24 or stored so that an accurate weigh of the one or more pieces in each cup may be determined. One or more pieces may be loaded into each cup (1606), such as by an operator or a machine or robot, so that the weight of the one or more pieces of product in each cup may be simultaneously determined by the multi-piece scale for example and the weight data may be uploaded (1608). Once the weights for each of the cup contents in a tray is determined, the robot may place the tray with the loaded cups onto the work surface in a position (1610) as determined by the computer system 24 or processor in the robot and the position may be stored in the system. The robot may then repeat the weighing of each cup of each tray and fill the work surface with the trays (1612). While all of the trays are weighed and placed onto the work surface, the combination of pieces of products for each processing bin are determined and the robot may deposit one or more pieces from one or more cups (1613) into each processing bin based on the determined combinations (1614). The trays with empty cups may then be removed from the work surface (1616). In some embodiments, since the system may have five processing bins, the combination of one or more pieces may be deposited into the processing bins in a batch mode, the full processing bins may be emptied, the now empty processing bins may be refilled with a new combination of pieces of product, etc. until all of the pieces in all or most of the cups are deposited into the processing bins. Once all of the pieces are deposited in the processing bins, the trays with the empty cups may be removed from the work surface. Thus, the trays with empty cups may be removed from the work surface singularly as the cups in a tray are emptied or all trays with empty cups may be removed at the same time. Alternatively, if only cups are being used in the system, then each cup may be removed from the work surface singularly as each cup is emptied or all cups may be removed at the same time.

FIG. 17 illustrates a second embodiment of the weighing and packaging system 10 with continuous throughput weighing and processing. The system has the same elements as described above and those elements will not be described again for this figure. In this embodiment, the system may be an input conveyor 1700 and an output conveyor 1702. A multipiece scale platform 1701 may be adjacent to the conveyors 1700, 1702 and remote from the work surface 14 and not attached to the work surface 14. The input conveyor 1700 may bring trays with weighed cups filled with pieces of product to a loading station from which the robot 16 may grab the tray and or cup and then place the tray onto the work surface. The output conveyor 1702 may receive trays with empty cups or unusuable payloads from a loading station wherein the robot may remove the trays and/or cups from the work surface. The multipiece scale platform 1701 may have two multi-piece scales 22A, 22B resting on the platform 1701 that perform the empty cup taring and filled cup weighing as described above.

Figure 18A:
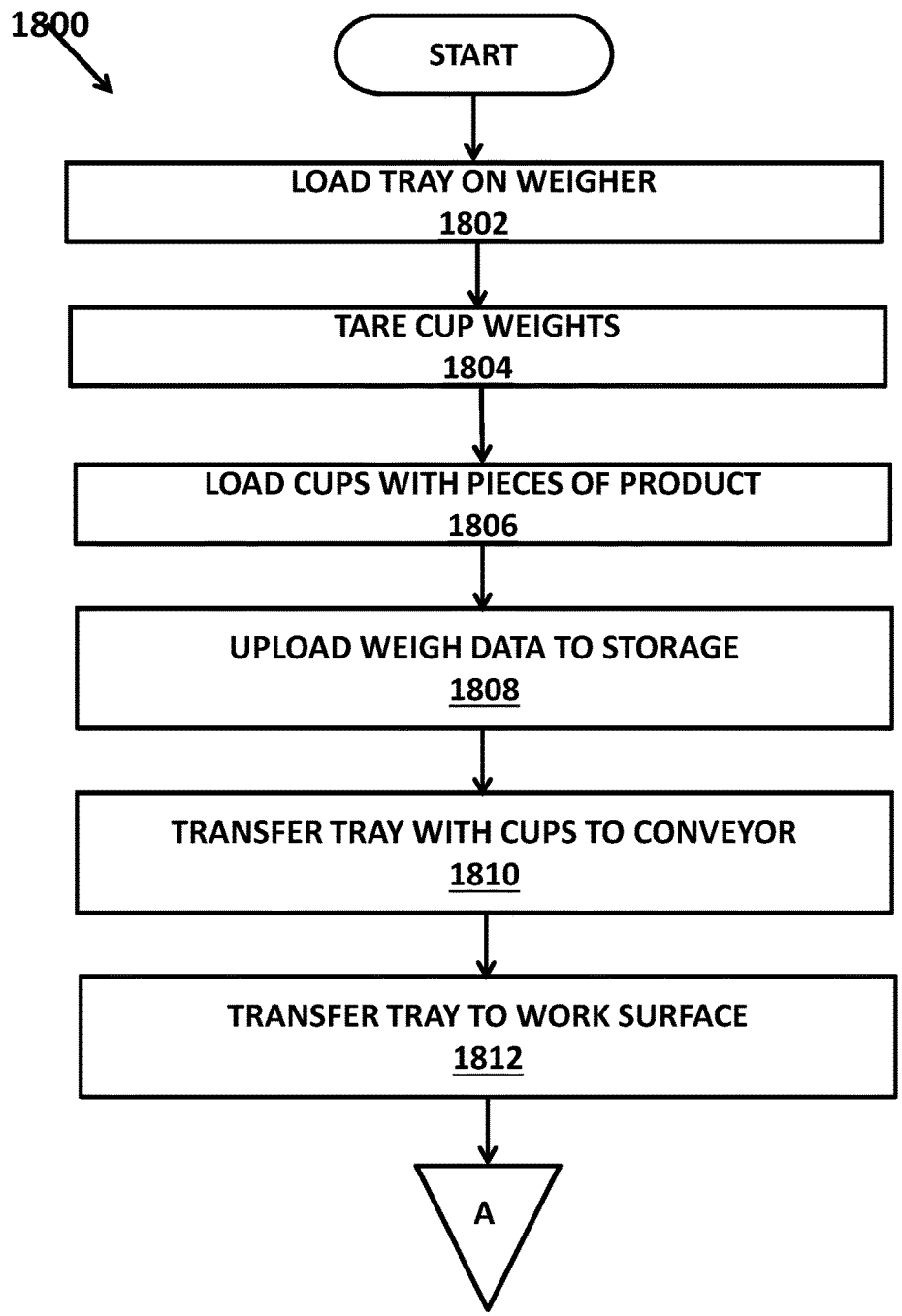
FIGS. 18A-C illustrate a continuous throughput weighing and processing process.
Figure 18B:
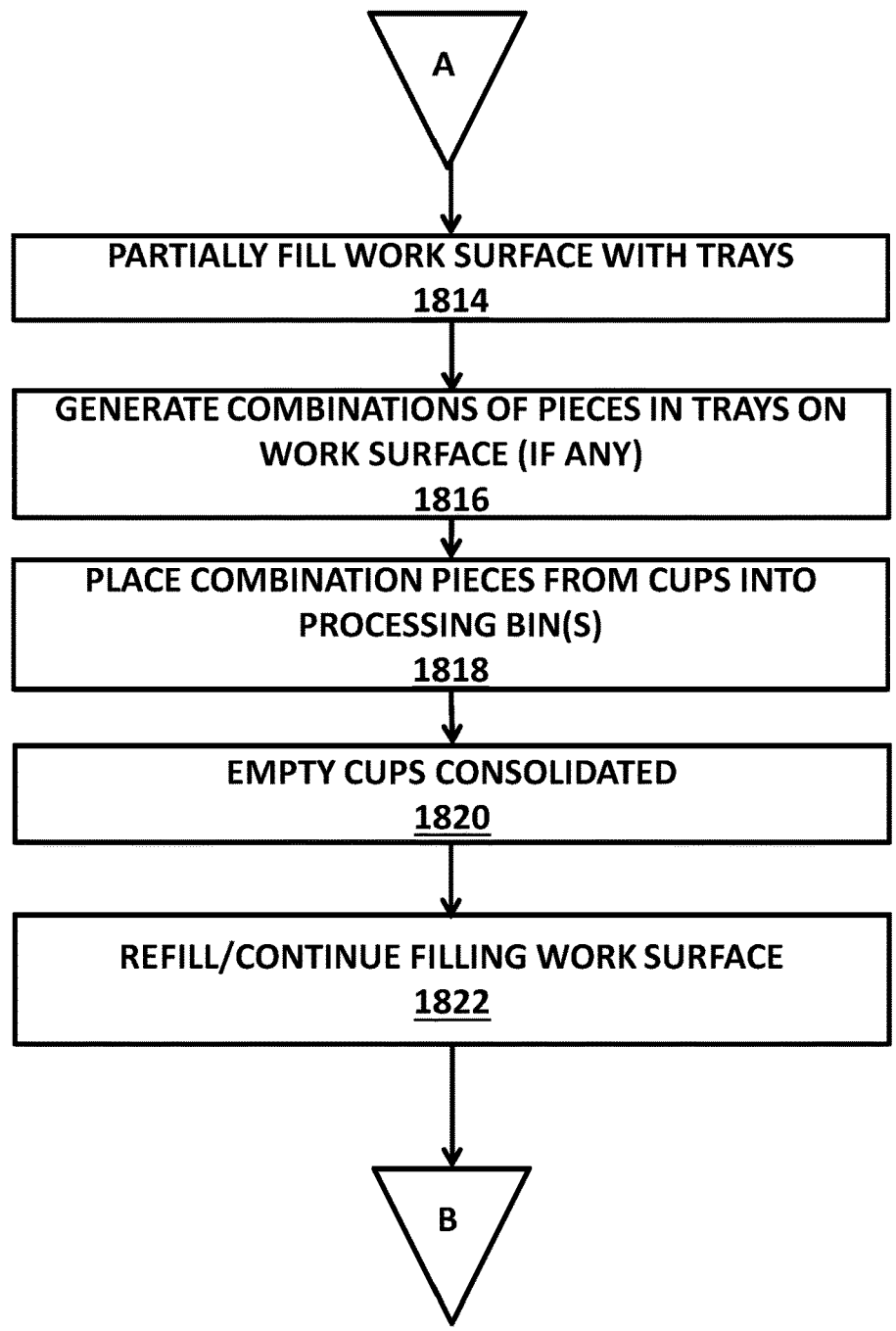
Figure 18C:
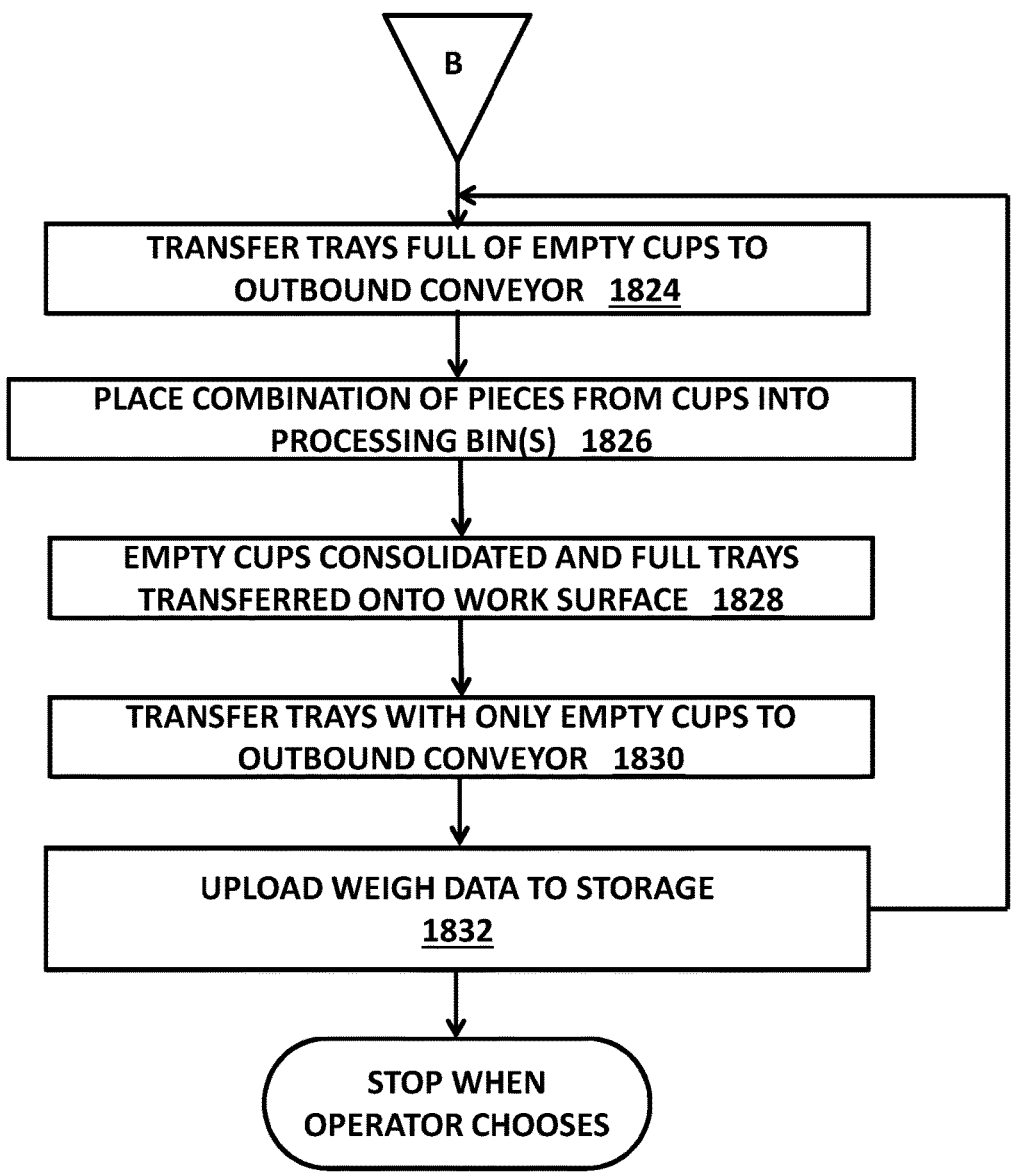

FIGS. 18A-C illustrate a continuous throughput weighing and processing process 1800 that may be performed by the system in FIG. 17. In the process, each tray with empty cups may be loaded onto the multipiece scale 22A or 22B (1802) and the tare weight of each cup may be determined and stored (1804) so that accurate weights of the one or more pieces of products in each cup may be determined. Each cup may be loaded with one or more pieces of product (1806) so that the weight of each cup is measured at the scales 22A, 22B and the weight data may be stored and/or uploaded to storage (1808). Once the cups in the tray are weighed, the tray may be moved to the conveyor (1810) and then moved to a position on the work surface (1812) by the robot.

The process may then partially fill the work surface with trays and filled cups (1814) and generate a combination of one or more pieces in the cups on the work surface for each processing bin (1816) using the computer system 24 and the plurality of lines of computer code executed by the processor of the computer system. The robot may then pick one or more cups based on commands from the computer system 24 based on the combination of pieces (e.g., pick cup "x" from work surface location "y" and place the contents of the cup into processing bin "z") and place the combination of one or more pieces in the one or more cups into a processing bin (1818). The process may then consolidate the empty cups (1820) and refill/continue filling the work surface with tray with filled cups (1822). The robot may then transfer trays full of empty cups to the output conveyor (1824). The robot may then continue to deposit the combination of one or more pieces of product into each processing bin (1826). The process may then consolidate empty cups and full trays may be transferred onto the work surface (1828). The robot may then transfer trays with only empty cups to the output conveyor (1830) and upload weight data to storage (1832). The process then may be completed.

Figure 19:
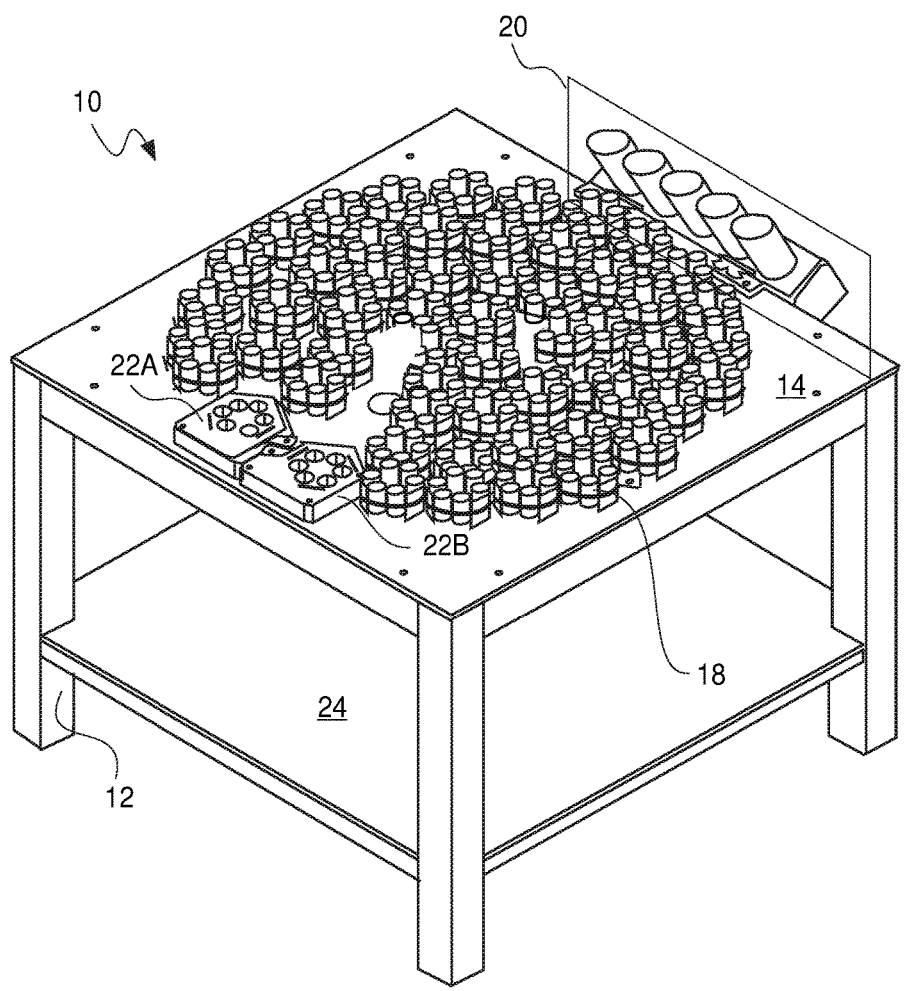
FIG. 19 illustrates a third embodiment of the weighing and packaging system with manual cup and tray transfer.

FIG. 19 illustrates a third embodiment of the weighing and packaging system 10 with manual cup and tray transfer. Most of the elements may be the same as the other embodiments and will not be described herein. In this embodiment, the system does not have a robot and a human being may: 1) place the trays with weighed cups (or just weighed cups) onto the work surface based on verbal or visual instructions from the computer system 24; 2) for each combination of pieces of product, pick the one or more cups with a combination of one or more pieces of product from the work surface at a particular one or more locations as indicated by the computer system; 3) deposit the one or more cup and or their contents into a processing bin as indicated by the computer system; and 4) may return the one or more cups to the locations in the work surface or may remove the cups from the work surface. In the embodiment in FIG. 19, the work surface may have indicators, such as visual indicators, adjacent the work surface that indicate a position on the work surface to/from which the operator places a tray or cup. In the embodiment in FIG. 19, each processing bin 20 may have indicators, such as visual indicators, adjacent each processing bin that indicate a processing bin into which each combination of one or more pieces may be deposited by the operator.

Figure 20A:
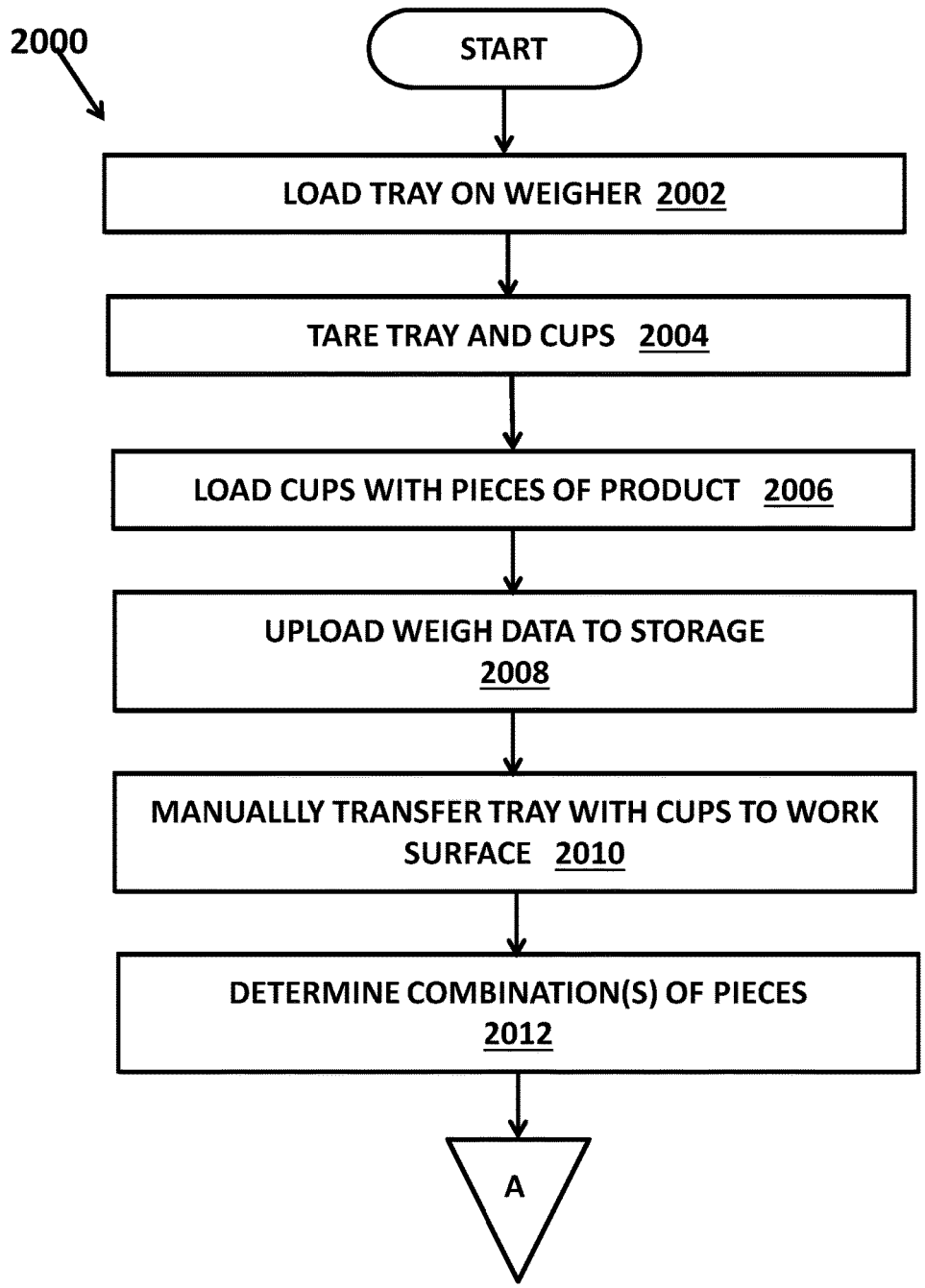
FIGS. 20A-B illustrate a manual weighing and processing process.
Figure 20B:
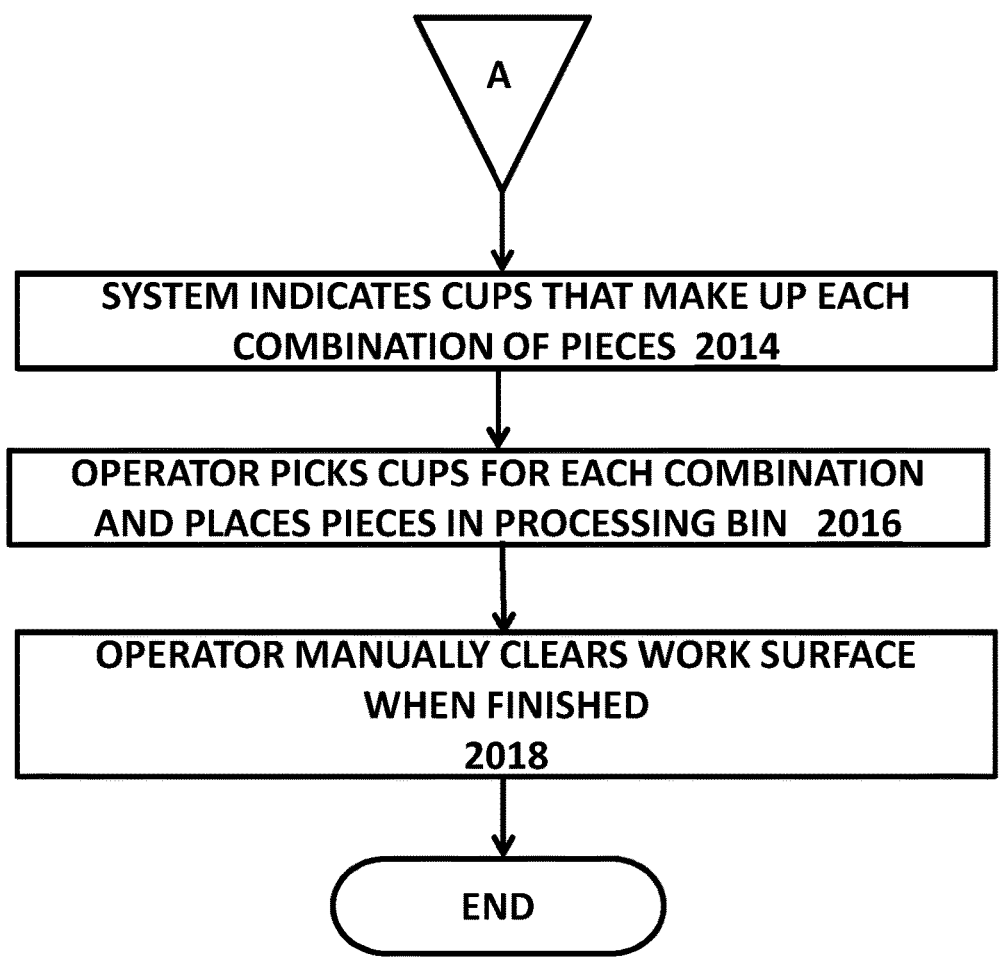

FIGS. 20A-B illustrate a manual weighing and processing process that may be performed by the system in FIG. 19. In the process, each tray with empty cups (of each empty cup) may be loaded onto the (weigher) scale (2002) and the tare weight of each cup may be stored (2004) so that accurate weights of the one or more pieces of products in each cup may be determined. Each cup may be loaded with one or more pieces of product (2006) so that the weight of each cup is measured and the weight data may be stored and/or uploaded to storage (2008). Once the cups in the tray are weighed, the tray may be manually moved to a position on the work surface (2010) to a position indicated by the computer system. The process may generate a combination of one or more pieces in the cups on the work surface for each processing bin (2012). The system may then indicate the one or more cups with the pieces that make up each combination of pieces to the operator (2014) and the operator picks the one or more cups for each combination and places the pieces into the respective processing bin (2016). The operator may then manually clear the work surface of the trays (or just the cups) when the combination of pieces of products are deposited into the processing bins (2018).

In each of the embodiments of the weighing process described above, the process may not be able to utilize one or more cups containing piece(s), so that the weighing and processing process may be completed while some cups still contain one or more pieces of product. Alternatively, the process may be temporarily halted while additional trays and cups (or cups) are weighed and or placed onto the work surface so that the process may be continued using the newly weighed trays and cups (or just cups) and the leftover one or more pieces of product in the cups. Alternatively, the weighing and processing process may also be stopped once a predetermined number of processing bins have been filled with one or more pieces of product.

In addition to the additional processing to package the one or more pieces of product, the system may also perform other processing as part of the weighing and processing process. For example, the system may include grouping to improve effectiveness which may include sorting prior to loading the one or more pieces into the cups. Specifically, multiple groups such as large, medium and small can be created from the post trim batch that would assist an operator in loading a "distribution" that facilitates statistical probability of efficiently sorting and combining more machine effectiveness.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, cloud internet server systems, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system, comprising:
one or more multi-piece weighing scales wherein each multi-piece weighing scale substantially simultaneously or simultaneously measures a weight of each piece repository on the scale, each piece repository having a tray and one or more cups that sit in the tray that contain one or more pieces of product in the piece repository so that the scale substantially simultaneously or simultaneously measures the weights of the one or more pieces of product in each piece repository;
a plurality of processing bins wherein at least one processing bin receives a predetermined number of pieces of product; and
a computer system that receives the weight of each piece of product in the plurality of piece repositories and generates a combination of one or more pieces to be placed into the processing bin so that a total weight of the combination of one or more pieces of product is within a predetermined weight range for the processing bin.

2. The system of claim 1 further comprising a robot that places the combination of one or more pieces into the processing bin.

3. The system of claim 2, wherein each piece repository further comprises a tray and one or more cups that sit in the tray wherein the robot places each tray and one or more cups onto a location on a work surface.

4. The system of claim 1, wherein each piece repository further comprises a cup into which one or more pieces of product are placed.

5. The system of claim 1, wherein each multi-piece weighing scale further comprises a plurality of weighing stations wherein each weighing station simultaneously measures a weight of the one or more pieces in each cup of the tray.

6. The system of claim 3, wherein each multi-piece weighing scale further comprises a plurality of weighing stations wherein each weighing station simultaneously measures a weight of the one or more pieces in each cup of the tray and the robot moves the tray and the one or more cups to the location on a work surface once the weights of the cups are determined.

7. The system of claim 1 further comprising a conveyor that transports the plurality of piece repositories between the one or more multi-piece weighing scales and a work surface.

8. The system of claim 2 further comprising a conveyor that transports the plurality of piece repositories between the one or more multi-piece weighing scales and a work surface wherein the robot transports the plurality of piece repositories to and from a location on the work surface.

9. The system of claim 1 further comprising a conveyor that transfers each piece repository to a work surface.

10. The system of claim 1 further comprising a packaging unit that packages the combination of one or more pieces placed in each processing bin into a package.

11. The system of claim 1 further comprising a processing unit that performs further processing on the combination of one or more pieces placed in each processing bin.

12. The system of claim 1, wherein the computer system uses a predetermined weight range wherein the total weight of the combination of pieces is greater than or equal to a target weight and less than an upper control weight.

13. A system, comprising:
one or more multi-piece weighing scales wherein each multi-piece weighing scale substantially simultaneously or simultaneously measures a weight of each piece repository on the scale, each piece repository having one or more pieces of product in the piece repository so that the scale substantially simultaneously or simultaneously measures the weights of the one or more pieces of product in each piece repository;
a plurality of processing bins wherein at least one processing bin receives a predetermined number of pieces of product;
a computer system that receives the weight of each piece of product in the plurality of piece repositories and generates a combination of one or more pieces to be placed into the processing bin so that a total weight of the combination of one or more pieces of product is within a predetermined weight range for the processing bin; and
a work surface onto which the plurality of piece repositories are placed, wherein the work surface further comprises a plurality of indicia wherein each indicia indicates a piece repository position on the work surface.

14. A system, comprising:

one or more multi-piece weighing scales wherein each multi-piece weighing scale substantially simultaneously or simultaneously measures a weight of each piece repository on the scale, each piece repository having one or more pieces of product in the piece repository so that the scale substantially simultaneously or simultaneously measures the weights of the one or more pieces of product in each piece repository;

a plurality of processing bins wherein at least one processing bin receives a predetermined number of pieces of product and wherein each processing bin has an indicator identifying the processing bin; and a computer system that receives the weight of each piece of product in the plurality of piece repositories and generates a combination of one or more pieces to be placed into the processing bin so that a total weight of the combination of one or more pieces of product is within a predetermined weight range for the processing bin.

* * * * *